US012736271B2

(12) United States Patent
Tolley et al.

(10) Patent No.: US 12,736,271 B2
(45) Date of Patent: Sep. 15, 2026

(54) MELTWATER MANAGEMENT SYSTEMS AND METHODS FOR COLD-CLIMATE HEAT PUMPS

(71) Applicant: Treau, Inc., San Francisco, CA (US)

(72) Inventors: Thomas Tolley, San Francisco, CA (US); Daniel B. Boman, San Francisco, CA (US); Jason Stein Wexler, San Francisco, CA (US); Neal Lawrence, San Francisco, CA (US); Rod Mobini, Oakland, CA (US)

(73) Assignee: Treau, Inc., San Francisco, CA (US)

( * ) Notice: Subject to any disclaimer, the term of this patent is extended or adjusted under 35 U.S.C. 154(b) by 196 days.

(21) Appl. No.: 18/536,990

(22) Filed: Dec. 12, 2023

(65) Prior Publication Data

US 2024/0191931 A1 Jun. 13, 2024

Related U.S. Application Data

(60) Provisional application No. 63/538,141, filed on Sep. 13, 2023, provisional application No. 63/432,309, filed on Dec. 13, 2022.

(51) Int. Cl.
*F25D 21/14* (2006.01)
*B05B 17/06* (2006.01)
*F25B 30/00* (2006.01)

(52) U.S. Cl.
CPC .............. *F25D 21/14* (2013.01); *F25B 30/00* (2013.01); *B05B 17/06* (2013.01)

(58) Field of Classification Search
CPC . F25D 21/04; F25B 30/00; F24F 1/031; F24F 1/027; B05B 17/06
See application file for complete search history.

(56) References Cited

U.S. PATENT DOCUMENTS

| | | | |
|---|---|---|---|
| 2,320,436 | A | 6/1943 | Hull |
| 2,436,713 | A | 2/1948 | Cody |
| 2,895,699 | A | 7/1959 | Lidsky |
| 3,176,474 | A | 4/1965 | Abbott |
| 3,491,549 | A | 1/1970 | Oglesby |
| 3,505,321 | A | 4/1970 | Hoffmeister et al. |
| 3,554,476 | A | 1/1971 | Gaylor, Jr. |
| 3,847,211 | A | 11/1974 | Fischel et al. |

(Continued)

FOREIGN PATENT DOCUMENTS

| | | | |
|---|---|---|---|
| CA | 2409963 | A1 | 5/2003 |
| EP | 1779965 | A2 | 5/2007 |

(Continued)

OTHER PUBLICATIONS

U.S. Appl. No. 17/017,066, filed Sep. 10, 2020.

(Continued)

*Primary Examiner* — Elizabeth J Martin
(74) *Attorney, Agent, or Firm* — Polygon IP, LLP

(57) ABSTRACT

A heat pump system comprising an external unit that includes an external unit heat exchanger and an external unit reservoir configured to receive fluid from the external unit heat exchanger. The heat pump system further comprises a fluid handling system that includes one or more sprayers configured to obtain fluid from the external unit reservoir and expel the obtained fluid from the external unit.

16 Claims, 28 Drawing Sheets

(56) References Cited

U.S. PATENT DOCUMENTS

| | | | |
|---|---|---|---|
| 4,393,662 | A | 7/1983 | Dirth |
| 4,407,358 | A | 10/1983 | Muellejans et al. |
| 4,440,639 | A | 4/1984 | Galuska |
| 4,641,503 | A | 2/1987 | Kobayashi |
| 4,809,516 | A | 3/1989 | Jones |
| 5,027,614 | A | 7/1991 | Mori et al. |
| 5,167,131 | A | 12/1992 | Karkhanis |
| 5,245,835 | A | 9/1993 | Cohen et al. |
| 5,355,688 | A | 10/1994 | Rafalovich et al. |
| 5,445,213 | A | 8/1995 | Im |
| 5,467,812 | A | 11/1995 | Dean et al. |
| 5,507,337 | A | 4/1996 | Rafalovich et al. |
| 5,582,025 | A | 12/1996 | Dubin et al. |
| 5,682,752 | A | 11/1997 | Dean |
| 6,138,987 | A | 10/2000 | Lee |
| 6,286,316 | B1 | 9/2001 | Waldrop et al. |
| 6,318,108 | B1 | 11/2001 | Holstein et al. |
| 6,343,482 | B1 | 2/2002 | Endo et al. |
| 6,389,834 | B1 | 5/2002 | LeClear et al. |
| 6,482,332 | B1 | 11/2002 | Malach |
| 6,525,505 | B2 | 2/2003 | Bay et al. |
| 6,840,056 | B2 | 1/2005 | Tanaka |
| 6,983,621 | B2 | 1/2006 | Cur et al. |
| 7,121,105 | B1 | 10/2006 | Rais |
| 8,281,614 | B2 | 10/2012 | Koo et al. |
| 9,303,895 | B1 | 4/2016 | Grant |
| 10,012,450 | B2 | 7/2018 | Riendeau |
| 10,401,043 | B2 | 9/2019 | Li |
| 10,775,054 | B2 | 9/2020 | Bradford et al. |
| 10,845,133 | B2 | 11/2020 | Romanin et al. |
| 11,143,467 | B2 | 10/2021 | Lynn et al. |
| 11,173,575 | B2 | 11/2021 | Rutkowski et al. |
| 11,253,958 | B2 | 2/2022 | Rutkowski et al. |
| 2002/0026800 | A1 | 3/2002 | Kasai et al. |
| 2003/0097854 | A1 | 5/2003 | Cur et al. |
| 2003/0110789 | A1 | 6/2003 | Cur et al. |
| 2005/0092474 | A1 | 5/2005 | Seidel |
| 2006/0107683 | A1 | 5/2006 | Song et al. |
| 2006/0157225 | A1 | 7/2006 | Martin et al. |
| 2008/0087031 | A1 | 4/2008 | Park et al. |
| 2009/0071181 | A1 | 3/2009 | Spanger |
| 2010/0229585 | A1 | 9/2010 | Bradford et al. |
| 2011/0024433 | A1 | 2/2011 | Rolland et al. |
| 2012/0269704 | A1 | 10/2012 | Hoglund et al. |
| 2014/0020421 | A1 | 1/2014 | Gallo |
| 2014/0096555 | A1 | 4/2014 | Ayub et al. |
| 2014/0373566 | A1 | 12/2014 | Swiderski |
| 2015/0202941 | A1 | 7/2015 | Yamamoto et al. |
| 2015/0354864 | A1 | 12/2015 | Katayama et al. |
| 2016/0043694 | A1 | 2/2016 | Price |
| 2016/0216039 | A1 | 7/2016 | Bergin et al. |
| 2016/0341498 | A1 | 11/2016 | Lynn et al. |
| 2017/0191763 | A1 | 7/2017 | Xu et al. |
| 2017/0297768 | A1 | 10/2017 | Gamboa |
| 2019/0107338 | A1 | 4/2019 | Romanin et al. |
| 2019/0264673 | A1 | 8/2019 | Lynn et al. |
| 2020/0003505 | A1 | 1/2020 | Minamitani |
| 2020/0124296 | A1 | 4/2020 | Baumann et al. |
| 2020/0197844 | A1 | 6/2020 | Stednitz |
| 2020/0222832 | A1 | 7/2020 | Holbach et al. |
| 2020/0238451 | A1 | 7/2020 | Rutkowski et al. |
| 2020/0238452 | A1 | 7/2020 | Rutkowski et al. |
| 2020/0248976 | A1 | 8/2020 | Powell |
| 2020/0356123 | A1 | 11/2020 | Sloo et al. |
| 2021/0078118 | A1 | 3/2021 | Li et al. |
| 2021/0088251 | A1 | 3/2021 | Martinez Galvan et al. |
| 2021/0190330 | A1 | 6/2021 | Martinez Galvan |
| 2021/0372637 | A1 | 12/2021 | Sharma et al. |
| 2023/0125880 | A1 | 4/2023 | Analytis et al. |
| 2023/0126498 | A1 | 4/2023 | Li et al. |
| 2023/0130691 | A1 | 4/2023 | Shah et al. |
| 2024/0191931 | A1 | 6/2024 | Tolley et al. |
| 2025/0085003 | A1 | 3/2025 | Boman et al. |
| 2025/0198650 | A1* | 6/2025 | Eicher .................... F24F 13/224 |
| 2025/0207812 | A1* | 6/2025 | Eicher .................... F24F 13/222 |
| 2025/0290663 | A1* | 9/2025 | Wang ......................... F24F 1/42 |

FOREIGN PATENT DOCUMENTS

| | | | |
|---|---|---|---|
| EP | 3608007 | B1 | 2/2021 |
| JP | H01163534 | A | 6/1989 |
| JP | H0689924 | B2 | 11/1994 |
| KR | 100249192 | B1 | 4/2000 |
| KR | 20010094180 | A | 10/2001 |
| KR | 10-2009-0088319 | A | 8/2009 |
| KR | 10-2020-0137311 | A | 12/2020 |
| KR | 10-2021-0080821 | A | 7/2021 |
| KR | 20210080821 | A | 7/2021 |
| KR | 10-2022-0045766 | A | 4/2022 |
| RU | 2100733 | C1 | 12/1997 |
| WO | 2019114943 | A1 | 6/2019 |
| WO | 2020105042 | A1 | 5/2020 |
| WO | 2022006296 | A1 | 1/2022 |

OTHER PUBLICATIONS

U.S. Appl. No. 12/724,036, filed Mar. 15, 2010.

China National Intellectual Property Administration First Office Action dated Feb. 3, 2024, Application No. 202080064212.X, 9 pages.

International Search Report and Written Opinion mailed Apr. 25, 2024, Patent Application No. PCT/US2023/083647, 11 pages.

"Ductless Split Heat Pump" Service Manual—GE Appliances 2021.

"Axial & Centrifugal Motorized Impellers" https://continentalfan.com/product-category/oem/motorized-impellers-oem/.

"DLFSFA and DLFLFA Console Ductless System Sizes 12 to 58" Service Manual—Midea Ductless 2018.

"Indoor Unit (Console) AJ009TNJDCH/AA" Service Manual—Samsung Electronics Co., Ltd. 2018.

"Light Commercial Split Systems 3D DC Inverter Heat Pump" Service Manual—Parker Davis NVAC International.

European Patent Office Search Report dated Jul. 17, 2023, Application No. 20863262, 8 pages.

International Search Report and Written Opinion mailed Feb. 20, 2023, Patent Application No. PCT/US2022/078555, 9 pages.

International Search Report and Written Opinion mailed Feb. 21, 2023, Patent Application No. PCT/US2022/078561, 13 pages.

International Search Report and Written Opinion mailed Feb. 22, 2023, Patent Application No. PCT/US2022/078562, 12 pages.

International Search Report and Written Opinion mailed Nov. 26, 2020, Patent Application No. PCT/US2020/050199, 7 pages.

International Search Report and Written Opinion mailed Sep. 2, 2021, Patent Application No. PCT/US2021/039932, 7 pages.

USPTO Office Action in U.S. Appl. No. 17/364,176 dated Jun. 15, 2023, 32 pages.

USPTO Office Action in U.S. Appl. No. 17/948,524 dated Mar. 17, 2023, 15 pages.

* cited by examiner

| Atomizer Type/Operating Voltage | Atomization Rate per Atomizer at 0 °C [L/day] | Atomization Rate per Atomizer at 30 °C [L/day] | Number of Atomizers to hit PRD Flow at ~ 0 °C | Number of Atomizers to hit PRD Flow at 30 °C |
|---|---|---|---|---|
| Target Value | 6.67 | 11.2 | ≤ 3 | ≤ 3 |
| 6.5 µm, 42.4 Vp | 4.51 | 8.79 | 5 | 4 |
| 7.5 µm, 42.4 Vp | 11.94 | 22.85 | 2 | 2 |
| 10 µm, 21.2 Vp | 2.11 | 7.66 | 10 | 5 |
| 13 µm, 21.2 Vp | 8.82 | 16.53 | 3 | 3 |

*Fig.28*

MELTWATER MANAGEMENT SYSTEMS AND METHODS FOR COLD-CLIMATE HEAT PUMPS

CROSS-REFERENCE TO RELATED APPLICATIONS

This application is a non-provisional of and claims the benefit of U.S. Provisional Application No. 63/432,309, filed Dec. 13, 2022, entitled "MELTWATER MANAGEMENT VIA ATOMIZATION IN COLD CLIMATE HEAT PUMPS, ". This application is hereby incorporated herein by reference in its entirety and for all purposes.

This application is also a non-provisional of and claims the benefit of U.S. Provisional Application No. 63/538,141, filed Sep. 13, 2023, entitled "Indoor Airflow Design for an Inverted-U Heat Pump,". This application is hereby incorporated herein by reference in its entirety and for all purposes.

This application also related to U.S. patent application Ser. No. 17/017,066, filed Sep. 10, 2020, entitled "WINDOW INSTALLATION SYSTEM AND METHOD FOR SPLIT-ARCHITECTURE AIR CONDITIONING UNIT,". This application is hereby incorporated herein by reference in its entirety and for all purposes.

This application is also related to U.S. patent application Ser. No. 12/724,036, filed Mar. 15, 2010, entitled "MODULAR AIR CONDITIONING SYSTEM,". This application is hereby incorporated herein by reference in its entirety and for all purposes.

BRIEF DESCRIPTION OF THE DRAWINGS

FIG. 12*a* illustrates an example embodiment of a fluid handling system which includes a fluid line that transports fluid to an external unit reservoir.

FIG. 12*b* illustrates another example embodiment of a fluid handling system which includes a fluid pump that pumps fluid through a throttling valve via a fluid line where fluid is expelled via a nozzle, which may include an active or passive port, drain, pump, atomizer, mister, sprayer or the like.

FIG. 12*c* illustrates another example embodiment of a fluid handling system that includes a rotary atomizer.

FIG. 28 illustrates the results of flow testing performed on 6.5 μm and 7.5 μm mesh atomizers at 42.4 V peak compared to 10 μm and 13 μm atomizers operating at 21.2 V peak to determine the number of atomizers required to generate a spray rate of at least 6.67 L/day at 0° C. and a spray rate of at least 11.2 L/day at 30° C., which is the estimated required spray rate for a system with 9000 BTU/hr nominal heating and cooling capacity in New York City. Larger spray rates can be targeted in some examples for larger capacity systems or systems installed in more humid climates, and smaller spray rates would be targeted for smaller capacity systems or systems installed in less humid climates.

Figure 1:
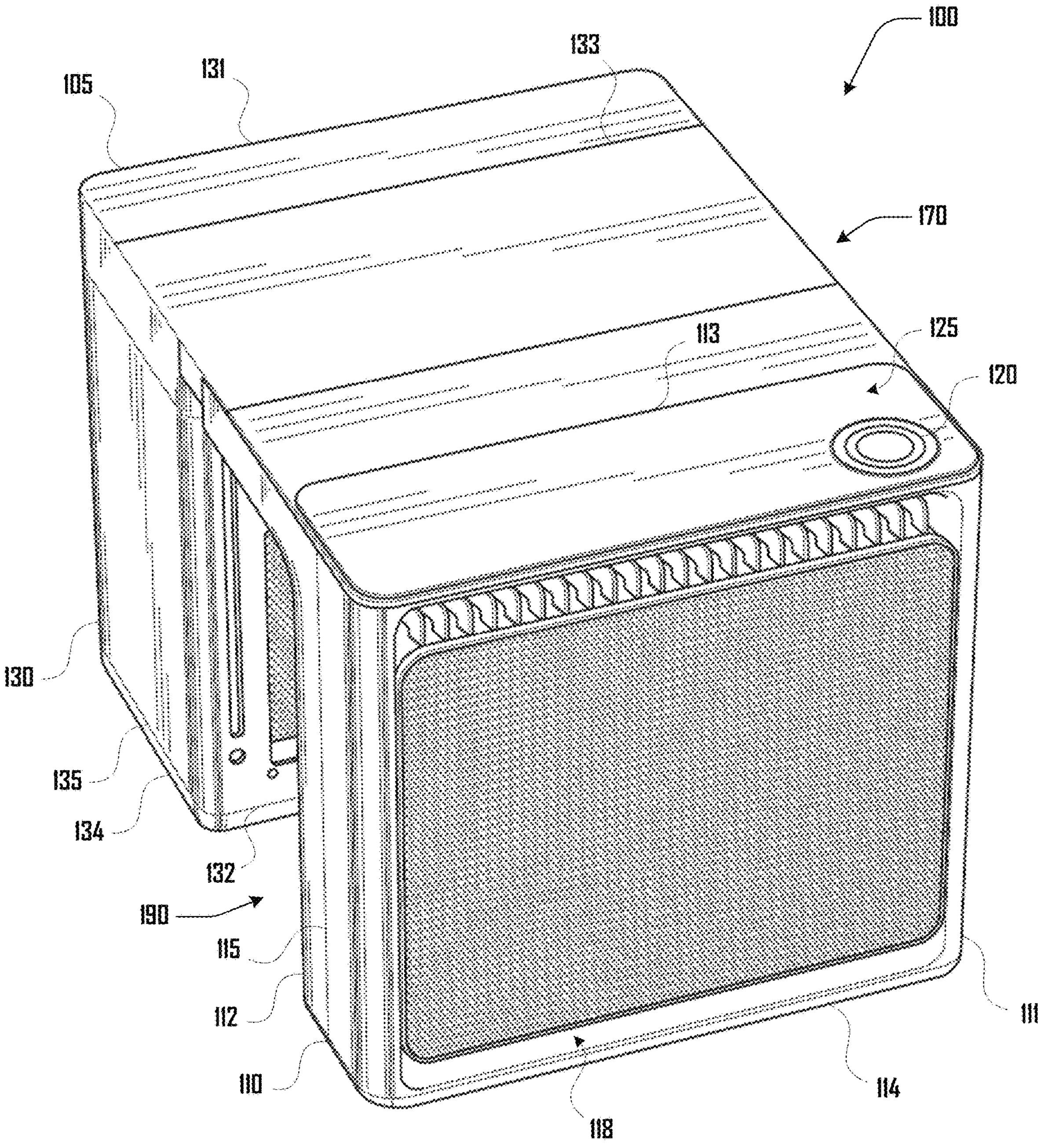
FIG. 1 is an example perspective view of a heat pump system in accordance with an embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

When air-source heat pumps operate in heating mode at colder outdoor temperatures, frost can form over their outdoor heat exchangers. As frost accumulates over the outdoor heat exchanger, it can obstruct airflow and can lower the efficiency of the heat pump. As a result, various air-source heat pumps often require periodic defrost cycles to melt the accumulated frost off of their outdoor heat exchangers and restore system efficiency.

In various embodiments, systems discussed herein can be configured to withstand a variety of adverse operating conditions that may be expected in the field including exposure to freezing temperatures, repeated freeze/thaw cycles, exposure to polluted meltwater, exposure to salt water, and exposure to high-density debris settling directly over atomizers or other parts of the system, exposure to high humidity, exposure to contaminated meltwater and the like.

In various air-source heat pumps, meltwater or condensate is allowed to drain off the heat exchanger and out of the outdoor unit, but this can be problematic for heat pumps without access to a condensate drainage line (such as window-mounted heat pumps) when they are installed in urban environments. The water draining from heat pumps mounted in higher story windows could freeze into ice sheets on the ground below the unit or icicles on the unit; both outcomes posing a hazard to pedestrians below. Additionally, the drained water could freeze onto the building below, potentially damaging its facade.

Various embodiments discussed herein include fluid management systems that obviate this concern by atomizing the meltwater produced during heat pump defrost cycles. In various embodiments, such designs can be used to dispose of condensate that is generated on the indoor coil during cooling mode, preventing the condensate from dripping from the outdoor unit. Systems of some examples can be configured to operate at various suitable temperatures including at or below −35° C., −30° C., −25° C., −20° C., −15° C., −10° C., −5° C., −4° C., −3° C., −2° C., −1° C., 0° C., 1° C., 2° C., 3° C., 4° C., 5° C., 10° C., 15° C., 20° C., 30° C., 35° C., 40° C., 45° C., 50° C., 55° C. or a range between such example values.

Aerosolized liquid droplets with diameters below a threshold can be sufficiently small to freeze before hitting the ground when falling from an elevated height at ambient air temperature of −2° C. or below. In various embodiments, liquid management systems discussed herein can be configured to generate liquid droplets, spray, mist, or the like, with various suitable diameters to allow the droplets to freeze or evaporate before hitting the ground to prevent generating undesirable conditions with liquid being expelled from the heat pump system. A variety of suitable spraying, misting or atomizing methods can achieve suitable droplet diameters as discussed herein including ultrasonic atomizers in some preferred embodiments. Various embodiments include meltwater management systems that atomize the meltwater produced by a heat pump during defrost cycles. The meltwater can be atomized via a variety of methods, including: cavitation ultrasound from a piezoelectric element; piezoelectric mesh elements; pumping through an atomizing nozzle; an ultrasonic nozzle; and rotary atomizers.

Some embodiments (e.g., cavitation ultrasound from a piezoelectric element or piezoelectric mesh elements) can incorporate piezoelectric elements running at high frequency integrated into a specialized water collection tray to atomize the water and expel it out of the heat pump system as a fine mist. For example, cavitation elements can include a partially or fully submerged piezoelectric disc that operates at high frequencies (e.g., 0.5-3 MHz) to vibrate free water surface to atomize water. Cavitation ultrasound in some examples can incorporate air movement (such as air driven by a fan) to expel the atomized water from the heat pump system. A meltwater collection tray in some examples can be designed to separate out any debris to prevent such debris from depositing over the piezoelectric elements, and may also incorporate an automatic or manual feature for disposing of the debris.

Some embodiments (e.g., pumping through an atomizing nozzle) can incorporate a nozzle, a pump, and an array of valves and filters to atomize water and expel it from the system as a fine mist. The circuiting of such a flow loop in some examples can be specifically designed to allow for both forward flow and reverse flow through the filters to dislodge debris which in some examples may significantly reduce or entirely obviate the need for servicing of integrated filters.

Some embodiments (e.g., rotary atomizer) can incorporate a pump, an array of valves and filters, and a rotary atomizer spinning at high speeds to atomize the water and expel it from the unit as a fine mist. The circuiting of such a flow loop in various examples can be designed similarly to the pump/nozzle example to allow for both forward flow and reverse flow through the filters to reduce or obviate the need for servicing of integrated filters in some examples. Alternatively, in some embodiments, water can be supplied to the rotary atomizer via gravity feed instead of a pump. Alternatively, in some embodiments, the rotation of a rotary atomizer can generate a centrifugal pressure that pumps the water without the need of a separate pump.

In various embodiments, freeze protection can be integrated, which can be provided in some examples by a resistive heater, a hot gas bypass heater, cavitation ultrasonic elements, a pump, and/or a heat pipe or other suitable heat transfer system to transfer heat from other parts of the system (such as a compressor) to a meltwater reservoir.

In various embodiments, water can be transferred to the atomizing elements directly or stored in a reservoir that the atomizing elements are connected to. The transfer can be done in some examples using height differences between the water source and the elements or reservoir, capillary action, or various suitable pumping devices.

One preferred embodiment includes multiple perforated mesh atomizers with a Positive Temperature Coefficient (PTC) heater to prevent the liquid in a meltwater or condensate tray from freezing. In some embodiments, a PTC heater can be an electric heater that uses PTC ceramic heating elements to generate heat, which in some examples are made of a PTC material that self-regulates its temperature. In various embodiments, when the temperature increases, the electrical resistance of the PTC material also increases, which in turn can reduce the electric current flowing through it. This self-regulating feature can make PTC heaters safer and more energy-efficient compared to other electric heaters in some examples, as PTC heaters can be less likely to overheat in some examples. In some embodiments, a linear PTC heater (e.g., 4, 5 or 6 feet in length) can have a rated power density of 3 W/ft. at 10° C. In some embodiments a PTC heater can operate at a voltage of 120 VAC with power <45 W. Some embodiments can operate with a power of <50 W.

One preferred embodiment includes measuring electrical current through the atomizers to determine if water is present and whether water, liquid or fluid expulsion or draining systems should be activated. Some embodiments can use a float switch or a float switch can be absent in some preferred embodiments. One preferred embodiment includes use of a drain plug that an installer or user can remove if they do not wish to use an atomizing feature. Some embodiments include an electrically operated drain valve, but an electrically operated drain valve is specifically absent in some embodiments.

In various embodiments, filtration to remove debris can be integrated. Such filtration could be achieved in some examples through the use of a physical filter, through features in a reservoir to separate low-density and high-density debris from the water, or through a separation tank to remove low-density and high-density debris from the water. Debris removal can also be achieved by mounting ultrasonic elements at an angle or at the water's surface.

In some embodiments, a fluid handling system can be incorporated into a heat pump system or an air conditioning system and can include one or more of the following: fluid collection tray; ultrasonic elements; float switch; freeze protect heater; over temperature thermostat; thermistor; drain valve; Printed Circuit Board Assembly (PCBA); and the like.

In some embodiments, fluid such as meltwater or condensate can drain into a fluid reservoir, run down a shallow incline of a fluid reservoir, and collect into a lower collection area. Sprayers (e.g., ultrasonic elements) can atomize liquid and expel it out of the collection tray/outdoor unit (e.g., based on signal from float switch or other suitable sensor). A freeze protect heater can trigger on/off in some examples based on readings from a thermistor being read by a PCBA or other suitable device to make sure liquid in the vicinity of the sprayers does not freeze solid. In some examples it can be desirable for the heater to have an over-temperature thermostat. A lower collection area in some examples can have a back slope to a drain port where a normally-closed drain valve can be opened as needed to drain liquid/debris from the tray.

Various embodiments can include a heat pump system that can comprise, consist of, or consist essentially of an outdoor unit, an indoor unit, a coupling assembly configured to facilitate installation and holding of the outdoor and indoor units on opposing sides of the sill of a window, and an operable coupling between the outdoor unit and indoor unit that provides for operation of the heat pump unit (e.g., one or more fluid lines, power lines, communication lines, and the like). As discussed herein, one or more of such elements can be modular.

Figure 2:
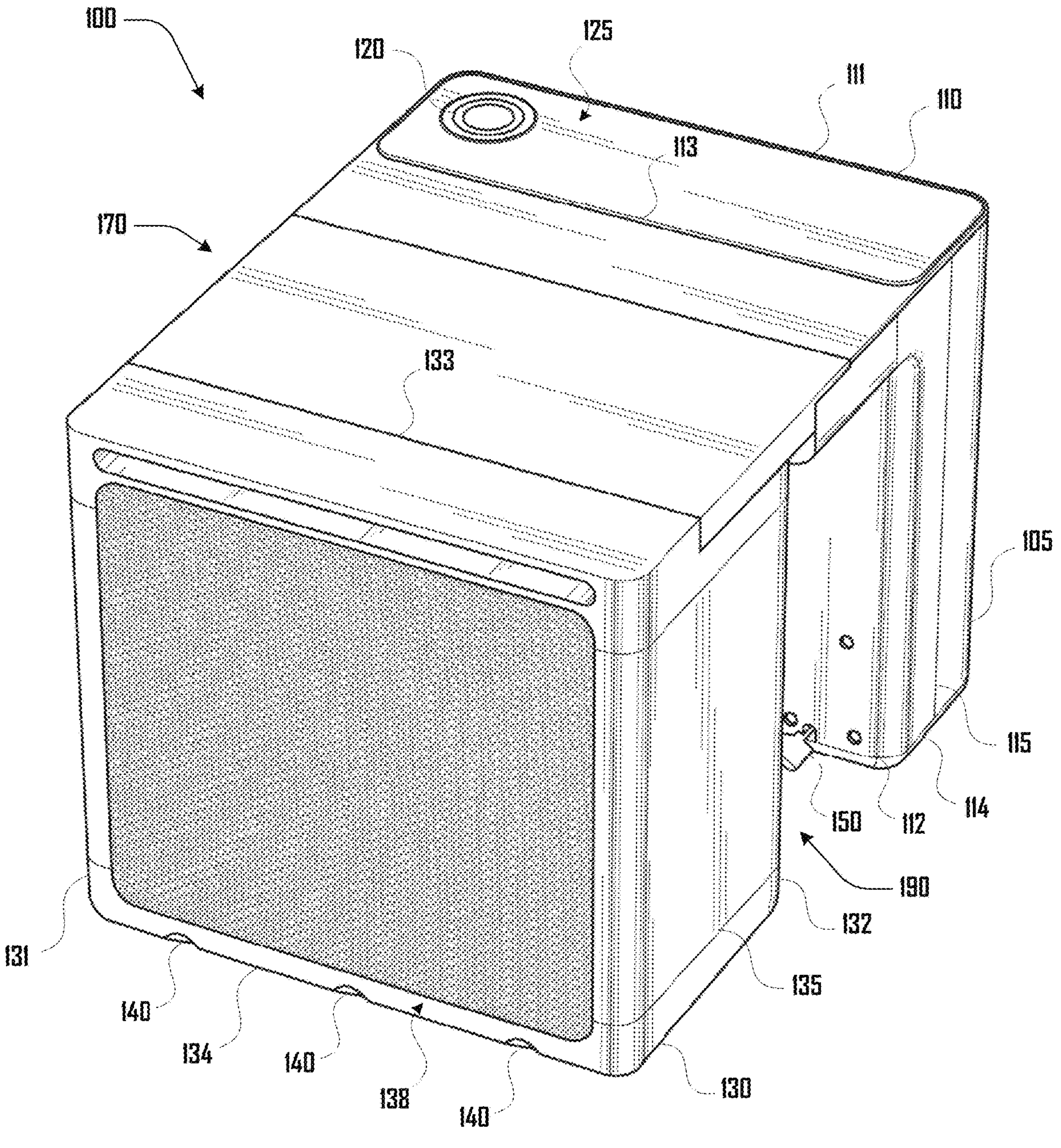
FIG. 2 is another example perspective view of a heat pump system in accordance with an embodiment.

Turning to FIGS. 1 and 2, example embodiments of a heat pump system 100 are illustrated, which can comprise an interior unit 110, an exterior unit 130, a coupling assembly 150 and a bridge 170, which can define a heat pump system cavity 190 between the interior and exterior units 110, 130 and below the bridge 170. The heat pump system 100 can further comprise an operable coupling, as discussed in more detail herein, between the exterior unit 130 and interior unit 110, such as below or within the bridge 170, that provides for operation of the heat pump system 100, which can include one or more fluid lines, power lines, communication lines, and the like.

As discussed in more detail herein (see e.g., FIGS. 2 and 3), in various embodiments, the coupling assembly 150 can be configured to couple with the sill of a window with the wall below the window sill being disposed within the cavity 190 such that the interior unit 110 is disposed within an indoor space proximate to the window; the exterior unit 130 is disposed in an outdoor space proximate to the window; and with the bridge 170 and operable coupling extending through the window and over the sill of the window.

As shown in the examples of FIGS. 1 and 2, the internal unit 110 can have a housing 105 generally cuboid and define a front face 111, internal face 112, top face 113, bottom face 114 and side faces 115. An internal unit grille 118, port or other suitable structure(s) can be defined by or disposed at a portion of the front face 111, which can provide a passage from inside the internal unit 110 through which conditioned air can be expelled into an internal environment and/or air can be taken in from the internal environment as discussed in more detail herein.

The external unit 130 can have a housing 105 that is generally cuboid and define a front face 131, internal face 132, top face 133, bottom face 134 and side faces 135. The external unit 130 can further include an external unit grille 138, port or other suitable structure(s), which can provide a passage from inside the external unit 130 through which conditioned air can be expelled into an external environment and/or air can be taken in from an external environment as discussed in more detail herein. The external unit 130 can further include one or more fluid ports 140 disposed proximate to the bottom face 134 as discussed in more detail herein.

In various embodiments, the heat pump system 100 can comprise various suitable types of user interfaces. For example, FIGS. 1 and 2 illustrates an example embodiment of a heat pump system 100 having an interface 120 disposed on the top face 113 of the internal unit 110. In various embodiments, the interface 120 has a cylindrical body with a display on the top of the interface with a rotatable interface ring defining a peripheral sidewall of the interface.

The display can comprise a screen in various embodiments, which may or may not be a touch screen that allows for input in addition to providing visual presentations. The interface ring can provide for one or more types of input in various embodiments, including via rotating of the interface ring, pressing the interface ring downward toward the top face 113 of the internal unit 110, pulling the interface ring upward away from the top face 113 of the internal unit 110, and the like. In some embodiments, the interface ring can be configured to rotate indefinitely without any stops or can be configured to rotate with one or more stop positions that stop rotation of the interface ring in the clockwise and counter-clockwise direction. In some embodiments, the interface ring can comprise additional interface elements such as one or more buttons, scroll wheels, touch screens, or the like. In some embodiments, the interface ring 620 does not turn. In some embodiments, the interface ring 620 can be absent. In some embodiments, the interface 120 can provide for various types of input or output including voice input, haptic output, sound output, and the like.

In some embodiments, the interface 120 can be the only interface element of the heat pump system 100, with other interface elements being absent. However, in further embodiments, any suitable additional and/or alternative interface elements can be present on the heat pump system 100. Examples of user interfaces 120 of various embodiments are shown and described in U.S. patent application Ser. No. 17/971,089, filed Oct. 21, 2022, entitled "USER INTERFACES AND CONTROLS FOR HVAC SYSTEM,". This application is hereby incorporate by reference herein in its entirety and for all purposes.

FIGS. 1 and 2 further illustrate an example of the top face 113 defining a tray 125, which in some embodiments can be desirable to provide a location for items to be placed and retained on the top face 113. In various embodiments, the interface 120 can be disposed within the tray 125.

Figure 3:
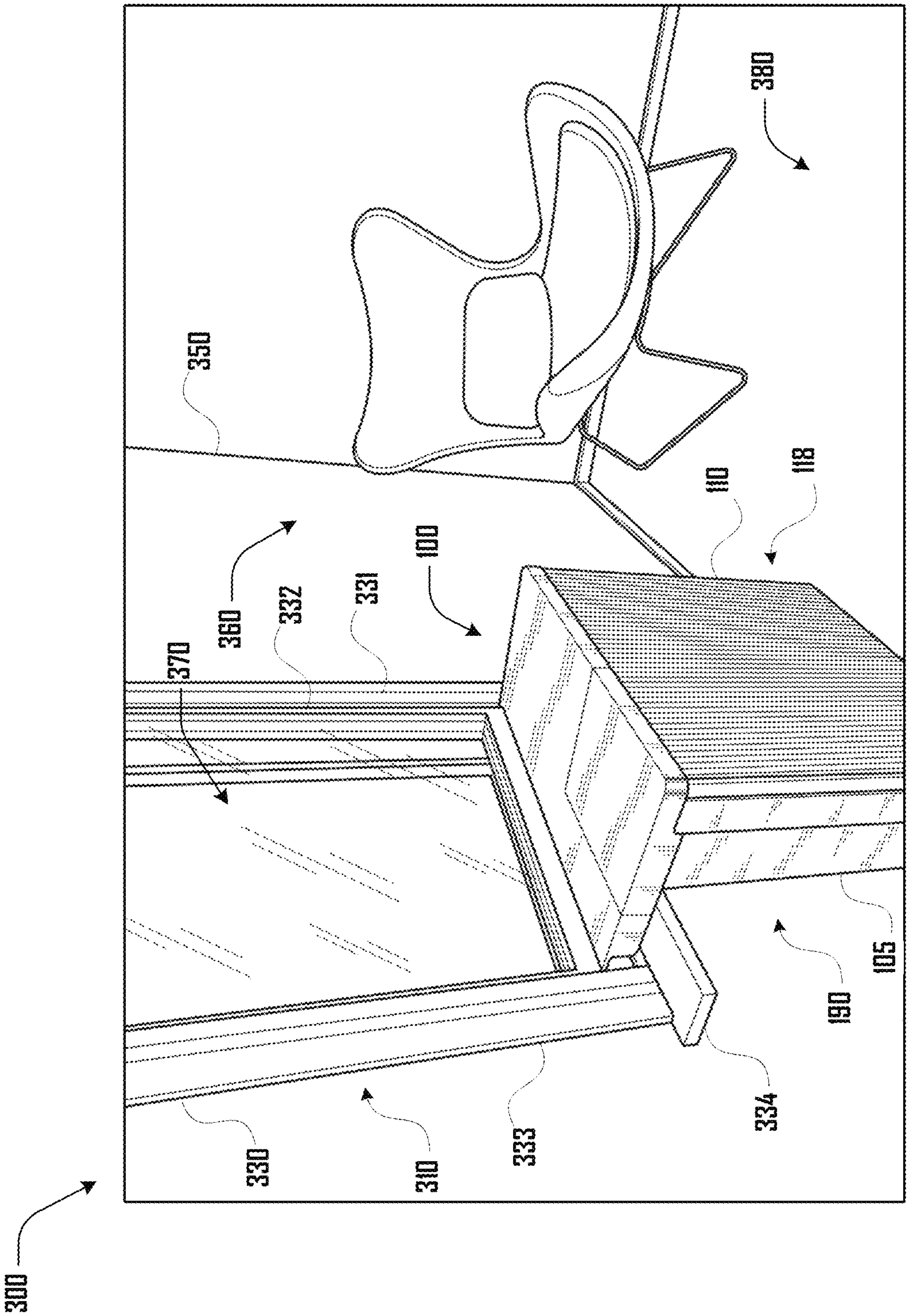
FIG. 3 is an example illustration of a heat pump system disposed within a window of a room of a building.

Turning to FIG. 3, an example building 300 is shown that includes a wall assembly 310 with a window 330 disposed within a wall 350, which separates an internal environment 360 within the building 300 (e.g., a room) from an external environment 370 that is external to the building 300 (e.g., an outdoor area). The example window 330 comprises a sash 331 and pane 332 that moveably reside within a frame 333 that includes a sill 334. The sash 331 can be configured to raise and lower within the frame 331, and when open, define an opening between the indoor and external environments 360, 370.

Figure 4:
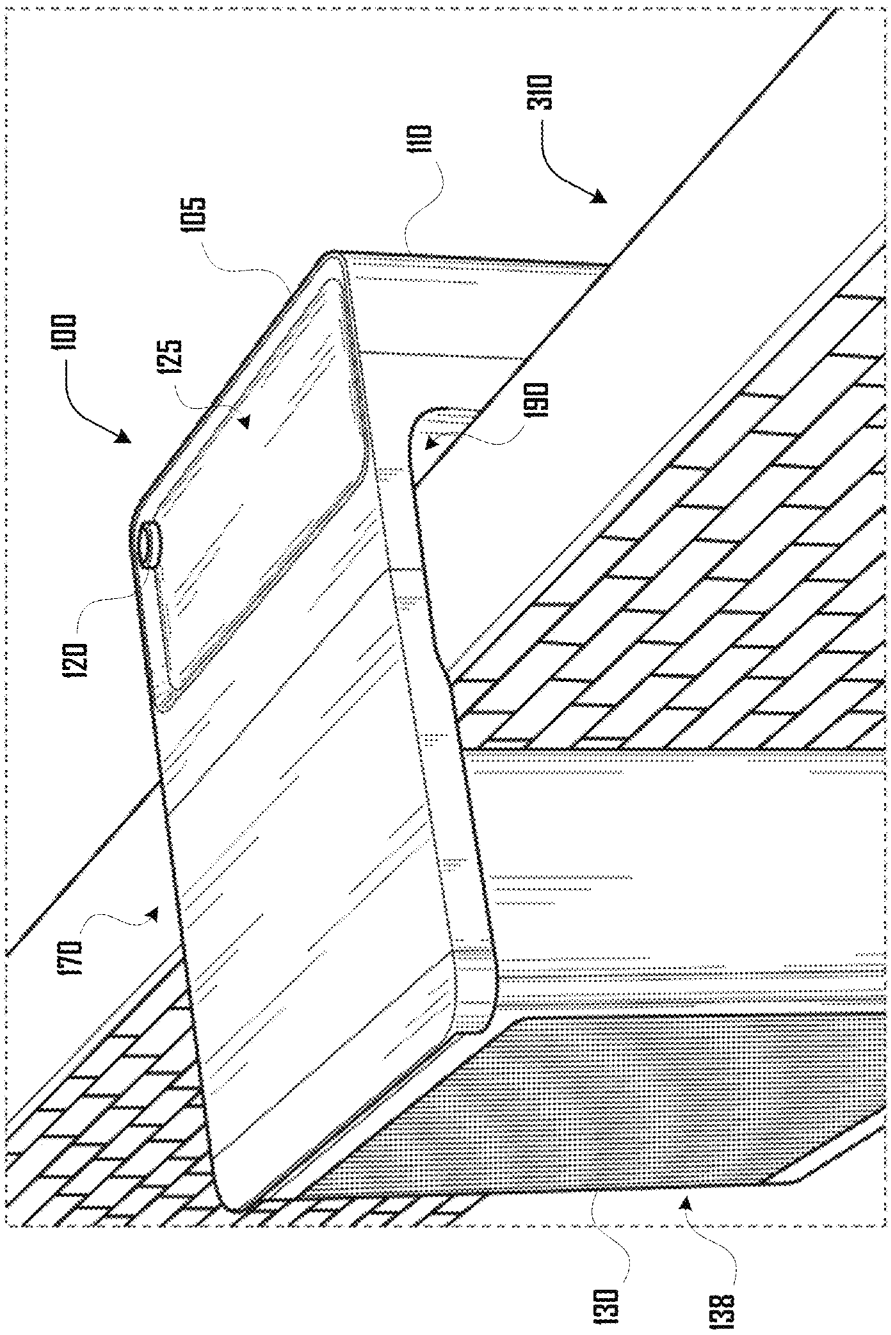
FIG. 4 illustrates another example embodiment of a heat pump system disposed over a wall assembly with a top portion of the wall assembly cutaway so that interior unit is more visible.

An example heat pump system 100 is shown disposed extending through the window 330 with the internal unit 110 disposed within the internal environment 360 and the external unit 130 disposed in the external environment 370. The internal and external units 110, 130 extend below the sill 334 toward a floor 380 of the building 300 with a portion of the wall 350 below the sill 334 disposed within the cavity 190 of the heat pump system 100. As discussed herein, the heat pump system 100 can be used to condition air in the internal and/or external environments 360, 370. For example, in various embodiments, the heat pump system 100 can be configured to cool the internal environment 360. In various embodiments, the heat pump system 100 can be configured to heat the indoor environment 360. FIG. 4 illustrates another example embodiment of a heat pump system 100 disposed over a wall assembly 310 where a portion of the wall assembly 310 is illustrated removed such that the internal unit is visible.

While some embodiments are configured for residential use of a heat pump unit within windows 330 of a home, it should be clear that a heat pump system 100 of further embodiments can be used in various other suitable ways, including in commercial settings such as in an office, factory, laboratory, school, vehicle, or the like. Also, the terms internal and external should not be construed to be limiting and are merely intended to represent separate environments, which can be partially or completely separated in various suitable ways, including by structures such as walls, windows, doors, screens, shades, partitions, sheets, and the like. Additionally, while various examples can relate to heat pumps, air conditioners, heaters, dehumidifiers, or humidifiers disposed within a window 330, it should be clear that further examples can be disposed in any suitable opening between internal and external environments, such as a door, slot, flue, vent, skylight, drain, or the like. Accordingly, the specific examples discussed herein should not be construed to be limiting on the wide variety of heat pumps units, or the like, that are within the scope and spirit of the present disclosure. For example, discussions of air conditioning, a heat pump, or similar terms herein should be construed generally to relate to a suitable system that conditions air (e.g., heat, cool, humidify, dehumidify, or the like) and not a specific system or configuration of system unless specifically defined.

Figure 5:
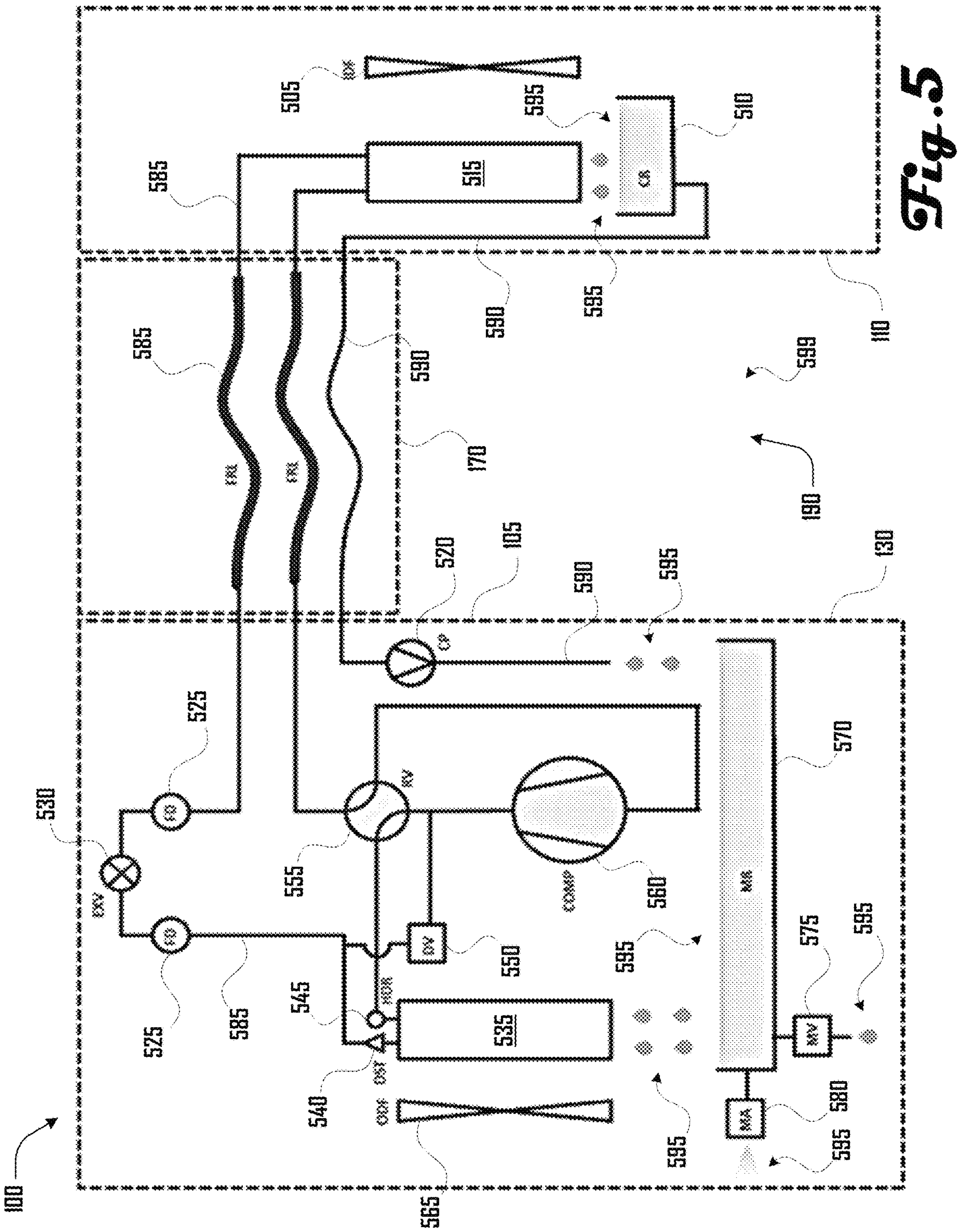
FIG. 5 illustrates an example embodiment of a heat pump system that includes an internal unit and an external unit coupled by a bridge and defining a cavity.

Turning to FIG. 5, an example embodiment of a heat pump system 100 is illustrated that includes an internal unit 110 and an external unit 130 coupled by a bridge 170 and defining a cavity 190. The heat pump system comprises a fluid handling system 599 as discussed in more detail herein. The internal unit 110 in this example comprises an internal unit fan 505, an internal unit reservoir 510 and an internal unit heat exchanger 515.

Additionally, the external unit 130 comprises a fluid pump 520, a first and second filter-drier 525, an electronic expansion valve 530, an external unit heat exchanger 535, a distributor 540, a header 545, a defrost valve 550, a reversing valve 555, a compressor 560 and an external unit fan 565. The external unit 130 further comprises an external unit reservoir 570, an external unit reservoir drain valve 575, and one or more sprayers 580.

A drain valve 575 of various embodiments can include a normally-closed (NC) valve that can be actuated to an open configuration as desired for liquid/debris draining purposes (e.g., based on a signal from a controller, PCBA, or the like). A drain valve 575 in various embodiments can help prevent a collection tray from overfilling in the event of rain/snow accumulation. Some examples of a drain valve can include a solenoid valve that runs on 24 VDC, 120 VAC, or the like. In various embodiments, it can be desirable for the drain valve 575 to be as large as possible to prevent debris accumulating in drain line (e.g., >3/8", >1/4", or the like). In some examples, a wax motor can actuate a drain sequence; for example, such an actuator can use the phase change of a wax to drive a linear actuation process. In other examples, a linear solenoid can actuate a drain sequence.

Elements such as the internal unit heat exchanger 515, first and second filter-drier 525, electronic expansion valve 530, external unit heat exchanger 535, distributor 540, header 545, defrost valve 550, reversing valve 555 and compressor 560 can be interconnected via refrigerant lines 585, which can facilitate functionalities as discussed herein such a heat pumping, air conditioning, heating, cooling, humidifying, de-humidifying, or the like. The fans 505, 565 can be configured to expel air from the internal or external units 110, 130 or draw air into the internal or external units 110, 130 to facilitate the functionalities discussed herein (e.g., in or out of grilles 118, 138 shown in FIGS. 1-4). In some embodiments, the external unit fan 565 can be configured to expel, help expel, or blow expelled droplets of water (e.g., atomized water) out of the external unit 110 or away from the external unit 110.

A fluid line 590 can be coupled to the internal unit reservoir 510, which can allow fluid 595 from the internal unit reservoir 510 to be pumped from the internal unit 110, through the bridge 170 and into the external unit reservoir 570 of the external unit 130 via the fluid pump 520.

For example, the internal unit heat exchanger 515 can generate a fluid 595 (e.g., a water condensate or melt) and the internal unit heat exchanger 515 can be positioned over the internal unit reservoir 510 such that gravity allows the fluid 595 generated by the internal unit heat exchanger 515 to drip or flow into the internal unit reservoir 510. The fluid pump 520 can pump fluid 595 present in the internal unit reservoir 510 through the bridge 170 and into the external unit reservoir 570 of the external unit 130 via the fluid lines 590. For example, the fluid line 590 can be disposed within the external unit 130 such that the fluid 595 drips or flows into the external unit reservoir 570.

Additionally, the external unit heat exchanger 535 can generate a fluid 595 (e.g., a water condensate or melt) and the external unit heat exchanger 535 can be positioned over the external unit reservoir 570 such that gravity allows the fluid 595 generated by the external unit heat exchanger 535 to drip or flow into the external unit reservoir 570.

Fluid 595 present in the external unit reservoir 570 can be removed therefrom in various suitable ways. For example, as shown in the example of FIG. 5, and as discussed in more detail herein, at least one sprayer 580 (e.g., atomizer, mister, sprayer, or the like) can be configured to remove fluid 595 from the external unit reservoir 570. In some embodiments, such a sprayer can generate fluid or liquid droplets having a diameter of equal to or less than 250 μm, 200 μm, 180 μm, 150 μm, 125 μm, 100 μm, 75 μm, 50 μm, 25 μm, and the like, or a range between such example values. Additionally, an external unit reservoir drain valve 575 can allow fluid 595 to leave the external unit reservoir 570. The embodiment of FIG. 5 is only one example embodiment and further embodiments can have any suitable elements or configuration. For example, in one embodiment an external unit reservoir drain valve 575 can be specifically absent.

Figure 6:
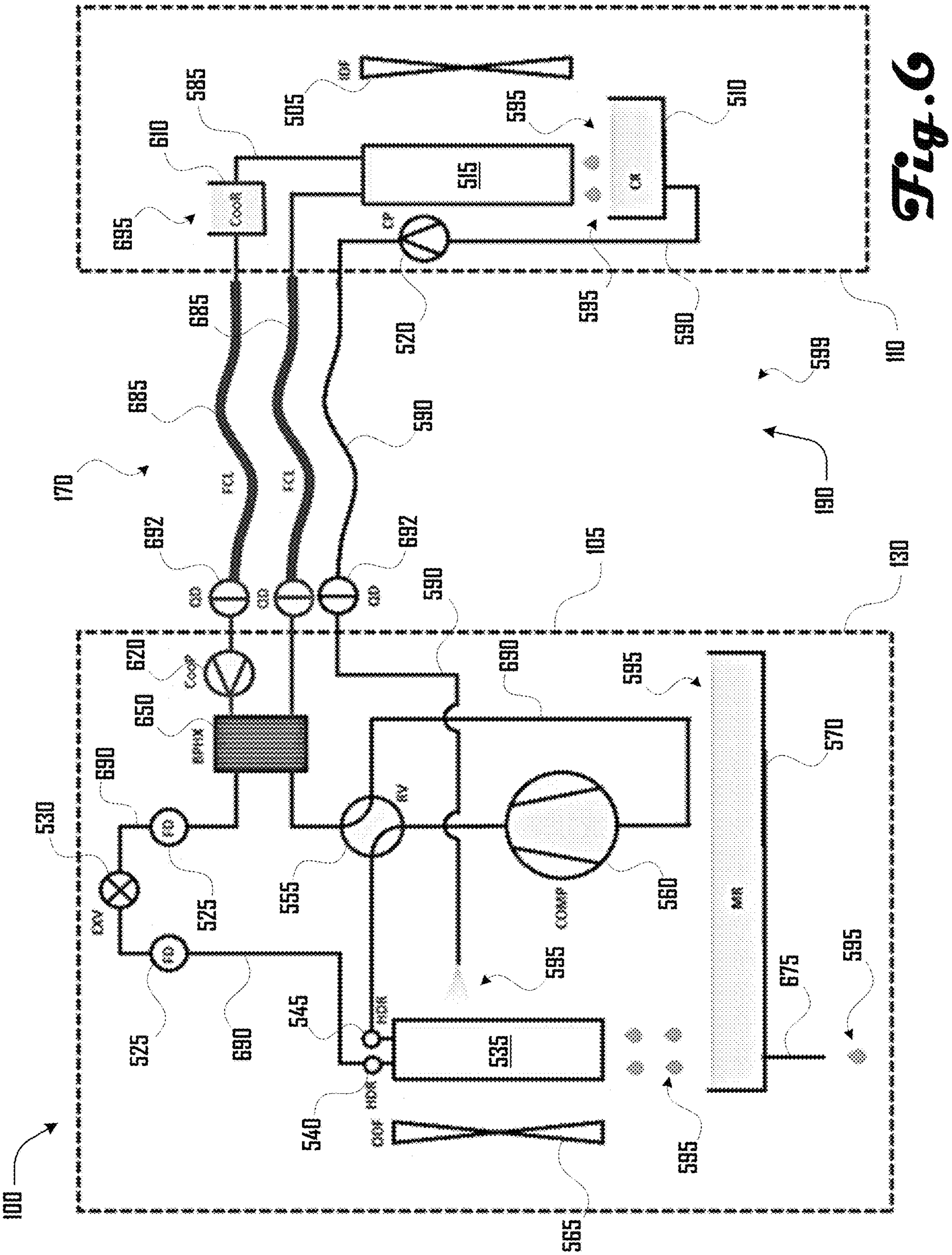
FIG. 6 illustrates another example embodiment of a heat pump system that includes an internal unit and an external unit coupled by a bridge and defining a cavity.

Turning to FIG. 6, another example embodiment of a heat pump system 100 is illustrated that includes an internal unit 110 and an external unit 130 coupled by a bridge 170 and defining a cavity 190. The internal unit 110 in this example comprises an internal unit fan 505, an internal unit reservoir 510, an internal unit heat exchanger 515, a fluid pump 520, and a coolant reservoir 610 that holds a coolant 695.

Additionally, the external unit 130 comprises a coolant pump 620, coolant/refrigerant heat exchanger 650, first and second filter-drier 525, an electronic expansion valve 530, an external unit heat exchanger 535, a distributor 540, a header 545, a reversing valve 555, a compressor 560 and an external unit fan 565. The external unit 130 in this example embodiment further comprises an external unit reservoir 570, and an external unit reservoir release 675.

Elements such as the internal unit heat exchanger 515, coolant reservoir 610, coolant pump 620, and coolant/refrigerant heat exchanger 650 can be interconnected via coolant lines 685. Elements such as the first and second filter-drier 525, electronic expansion valve 530, external unit heat exchanger 535, distributor 540, header 545, reversing valve 555 and compressor 560 and coolant/refrigerant heat exchanger 650 can be interconnected via refrigerant lines 690. The elements of such coolant and refrigerant systems can facilitate functionalities as discussed herein such a heat pumping, air conditioning, heating, cooling, humidifying, de-humidifying, or the like.

The fans 505, 565 can be configured to expel air from the internal or external units 110, 130 or draw air into the external units internal or external units 110, 130 to facilitate the functionalities discussed herein (e.g., in or out of grilles 118, 138 shown in FIGS. 1-4).

A fluid line 590 can be coupled to the internal unit reservoir 510, which can allow fluid 595 from the internal unit reservoir 510 to be pumped from the internal unit 110, through the bridge 170 and into the external unit 130 via the fluid pump 520.

For example, the internal unit heat exchanger 515 can generate a fluid 595 (e.g., a water condensate or meltwater) and the internal unit heat exchanger 515 can be positioned over the internal unit reservoir 510 such that gravity allows the fluid 595 generated by the internal unit heat exchanger 515 to drip or flow into the internal unit reservoir 510. The fluid pump 520 can pump fluid 595 present in the internal unit reservoir 510 through the bridge 170 and into the external unit 130 via the fluid lines 590. For example, the fluid line 590 can be disposed within the external unit 130 such that the fluid 595 drips or flows into the external unit reservoir 570, is expelled from the external unit 130 into an environment external to a housing of the external unit 130, or the like.

Additionally, the external unit heat exchanger 535 can generate a fluid 595 (e.g., a water condensate or melt) and the external unit heat exchanger 535 can be positioned over the external unit reservoir 570 such that gravity allows the fluid 595 generated by the external unit heat exchanger 535 to drip or flow into the external unit reservoir 570.

Fluid 595 present in the external unit reservoir 570 can be removed therefrom in various suitable ways. For example, as shown in the example of FIG. 6, and as discussed in more detail herein, an external unit reservoir release 675 (e.g., an active or passive drain, pump, or the like) can cause the fluid 595 in the external unit reservoir 570 to be expelled from the external unit 130 into an environment external to a housing of the external unit 130 (e.g., from the bottom of the external unit 130), or the like. Some embodiments can alternatively or additionally include one or more sprayers 580 (e.g., atomizer, mister, sprayer, or the like) that can be configured to remove fluid 595 from the external unit reservoir 570. Additionally, an external unit reservoir drain valve 575 (see FIG. 5) can allow fluid 595 to leave the external unit reservoir 570. The embodiment of FIG. 6 is only one example embodiment and further embodiments can have any suitable elements or configuration. For example, elements of FIGS. 5 and 6 can be suitably interchanged in various further embodiments or such elements can be specifically absent in some embodiments. For example, systems shown and described in U.S. patent application Ser. No. 12/724,036, filed Mar. 15, 2010, entitled "MODULAR AIR CONDITIONING SYSTEM,", can be present in further example embodiments.

Additionally, as shown in the example of FIG. 6, the bridge 170 can comprise a plurality of quick-disconnect couplers 692 that couple respective portions of coolant lines 685 and fluid lines 590. In various embodiments, providing quick-disconnect couplers 692 can be desirable for modular installation and/or servicing a heat pump system 100. Examples of such installation are discussed in U.S. patent application Ser. No. 17/017,066, filed Sep. 10, 2020, entitled "WINDOW INSTALLATION SYSTEM AND METHOD FOR SPLIT-ARCHITECTURE AIR CONDITIONING UNIT,".

In various embodiments, the heat pump system 100 can comprise a suitable electronic or computing device (e.g., a PCBA), which can include elements like a processor, memory and the like. The heat pump system 100 can comprise a computer readable medium (e.g., memory) that stores instructions that when executed cause the heat pump system 100 to perform various functions including heat pumping, air conditioning, heating, cooling, humidifying, de-humidifying, or the like as discussed herein. Additionally, in various embodiments the heat pump system 100 can comprise a communication system that allows the heat pump system 100 to communicate with other devices and systems via a suitable network including Wi-Fi, the Internet, a Local Area Network (LAN), Wide Area Network (WAN) or the like.

Figure 7:
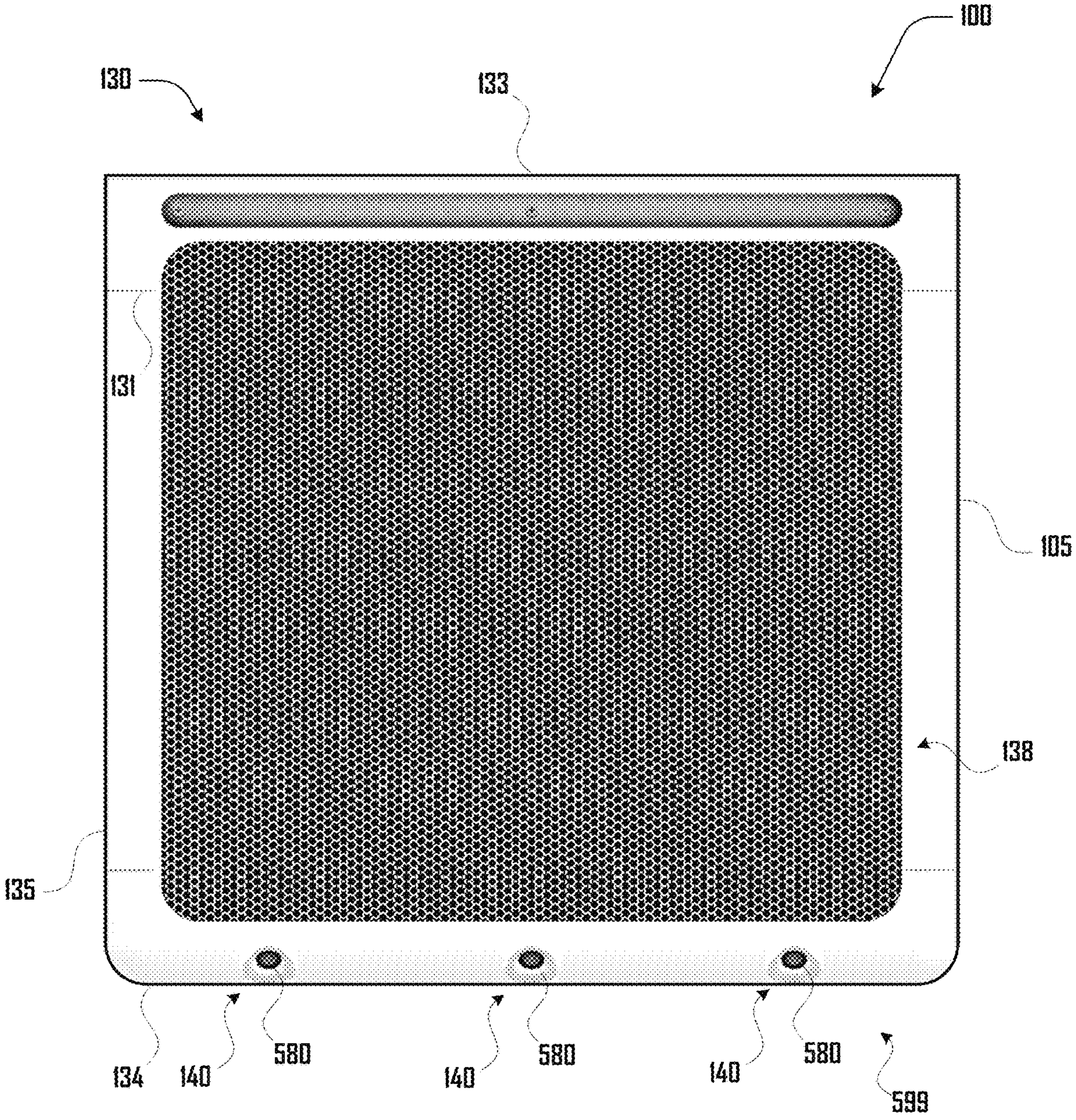
FIG. 7 illustrates an embodiment of a heat pump system, which comprises three fluid ports disposed proximate to a front face and a bottom face of an external unit of a heat pump system.

Turning to FIG. 7, an embodiment of a heat pump system 100 is illustrated, which comprises three fluid ports 140 disposed proximate to the front face 131 and bottom face 134 of an external unit 130 of the heat pump system 100. The fluid ports 140 can be associated with respective sprayers 580 (e.g., atomizers, misters, sprayers, or the like) that can be configured to expel fluid from the external unit 130. While the example of FIG. 7 illustrates an embodiment having three fluid ports 140 associated with three respective sprayers 580, further embodiments can include any suitable number of fluid ports 140 and sprayers 580 including 1, 2, 3, 4, 5, 6, 7, 8, 9, 10, 12, 15, 20, 25 or the like.

Figure 8:
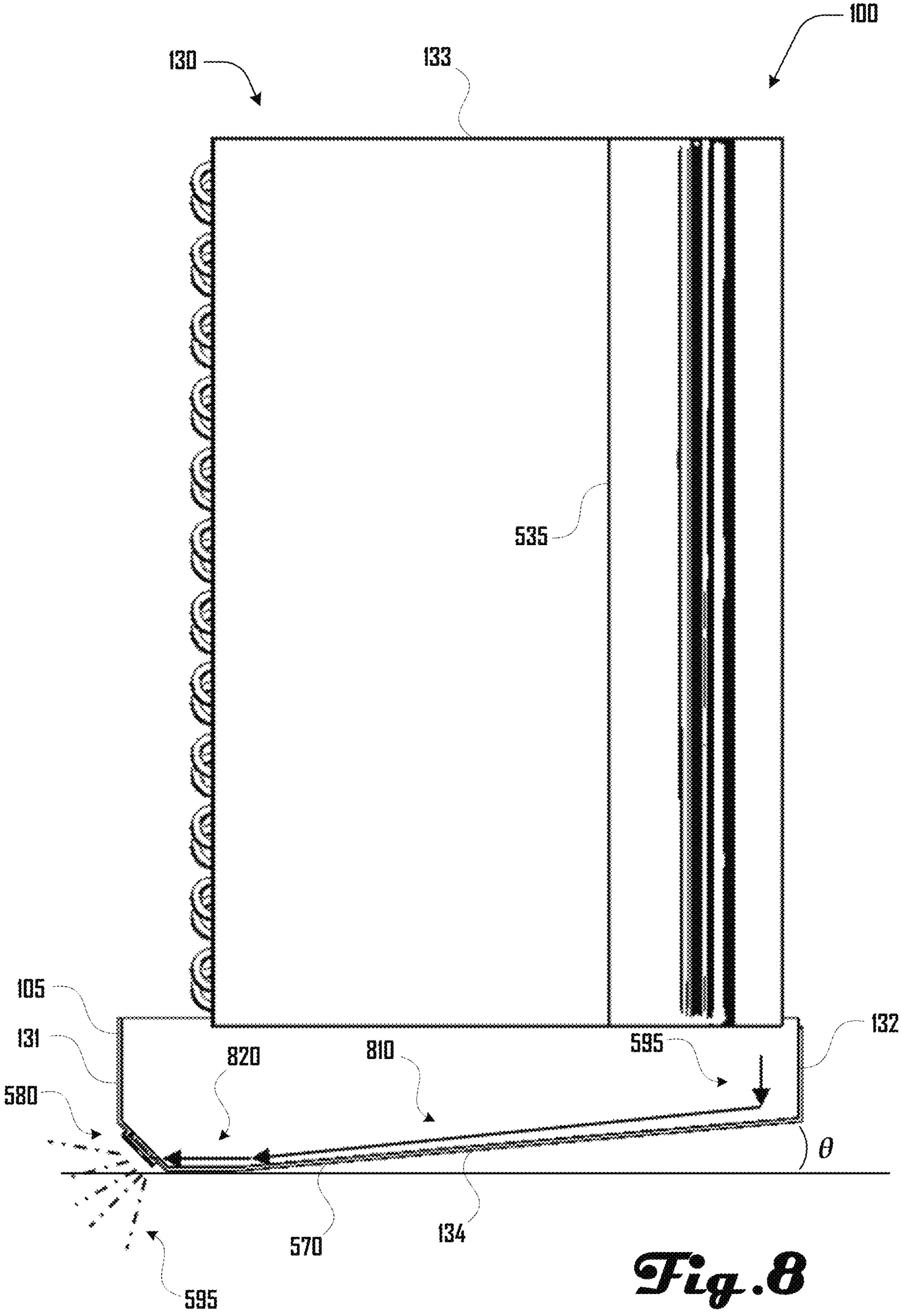
FIG. 8 illustrates a cutaway side view of an external unit of a heat pump system where an external unit reservoir is defined by a portion of the housing of the external unit.

In various embodiments, an external unit reservoir 570 can be a body that is internal to and separate from a housing 105 of an external unit 130; however, in some embodiments, the external unit reservoir 570 can be in part or in whole defined by a housing 105 of the external unit 130 including being an integral part of the housing 105 in some embodiments. For example, FIG. 8 illustrates a cutaway side view of an external unit 130 of a heat pump system 100 where an external unit reservoir 570 is defined by a portion of the housing 105 of the external unit 130. As shown in this example, an external unit heat exchanger 535 can generate fluid 595 such as via condensation on the external unit heat exchanger 535 and/or frozen liquid on the external unit heat exchanger 535 melting, or the like, and this fluid 595 can fall, drip or otherwise move downward into the external unit reservoir 570, where the fluid 595 can be expelled via one or more sprayers 580. For example, a fluid intake can be present proximate to the sprayers 580 and/or front of the external unit 130, which can intake fluid 595 in the external unit reservoir 570 and expel the fluid 595 via the one or more sprayers 580.

In various embodiments, the one or more sprayers 580 can be disposed at various suitable angles such as 45° as shown in FIG. 8. In further embodiments, one or more sprayers 580 can be disposed at various suitable angles such as 0°, 5°, 10°, 15°, 20°, 25°, 30°, 35°, 40°, 45°, 50°, 55°, 60°, 65°, 70°, 75°, 80°, 85°, 90° or the like, or a range between such example values. In one embodiment the one or more sprayers 580 can be disposed at an angle between 40° and 50°.

As shown in the example of FIG. 8, the external unit reservoir 570 can comprise a slope 810 to allow for fluid 595 to drain toward a collection area 820. The slope 810 can be from a rear face 132 of the external unit reservoir 570 toward a front face 131 of the external unit reservoir 570. In some embodiments, the slope 810 can be linear with an angle θ of at least 5°, at least 2°, or the like. In some embodiments, the slope 810 can have an angle θ of 2.0°, 2.2°, 2.4°, 2.6°, 2.8°, 3.0°, 3.2°, 3.4°, 3.6°, 3.8°, 4.0°, 4.2°, 4.4°, 4.6°, 4.8°, 5.0°, 5.2°, 5.4°, 5.6°, 5.8°, 6.0°, 6.2°, 6.4°, 6.6°, 6.8°, 7.0°, or the like, or a range between such example values. In some embodiments, the collection area 820 can be flat or have a slight slope (e.g., equal to or less than 0.2°, 0.4°, 0.6°, 0.8°, 1.0°) toward the front face 131 of the external unit reservoir 570.

In various embodiments, the external unit reservoir 570 can be configured to hold various volumes of fluid 595, including one preferred embodiment that holds between 2 to 6 Liters of fluid. Some embodiments can be configured to hold 0.5 L, 1 L, 1.5 L 2 L, 2.5 L, 3 L, 3.5 L 4 L, 4.5 L, 5 L, 6 L, 7 L, 8 L, 9 L, 10 L, 15 L, 25 L, or the like or a range between such example values.

Figure 9:
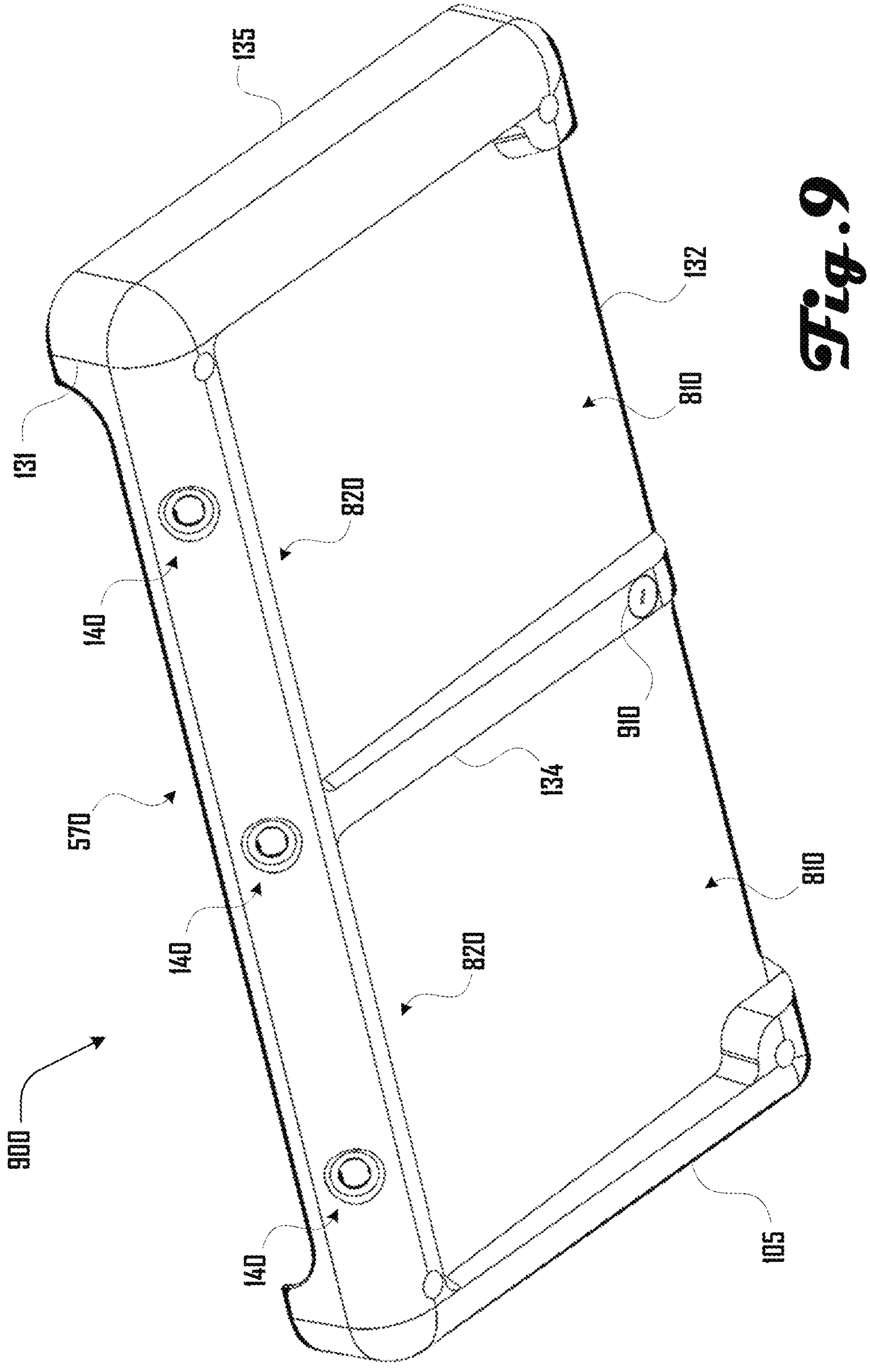
FIG. 9 illustrates an example bottom perspective view of a housing base defining an external unit reservoir for an exterior unit of a heat pump system in accordance with an embodiment.

FIG. 9 illustrates an example bottom perspective view of a housing base 900 defining an external unit reservoir 570 for an exterior unit 130 of a heat pump system 100 in accordance with an embodiment. In this example, the housing base 900 comprises three fluid ports 140 for sprayers 580. The housing base 900 of this example comprises a slope 810 to allow for fluid 595 to drain toward a collection area 820 with the slope 810 being from a rear face 132 of the external unit reservoir 570 toward a front face 131 of the external unit reservoir 570.

The housing base 900 also comprises a drain plug 910, which in some examples can be used to manually drain the external unit reservoir 570 or can be a location for installing a drain valve or the like (see e.g., external unit reservoir drain valve 575, external unit reservoir release 675, or the like). The drain plug 910 can be desirable in some embodiments for an alternative or addition to removal of fluid 595 via sprayers 580.

Removing the fluid 595 from the collection area 820 can be triggered in various suitable ways including by sensing fluid 595 in the collection area 820, sensing one or more threshold amount of fluid 595 in the collection area 820, via a float sensor, measuring electrical current through an element (e.g., one or more sprayers 580), one or more fluid or moisture sensor, measuring current through a pump, or the like.

Figure 23:
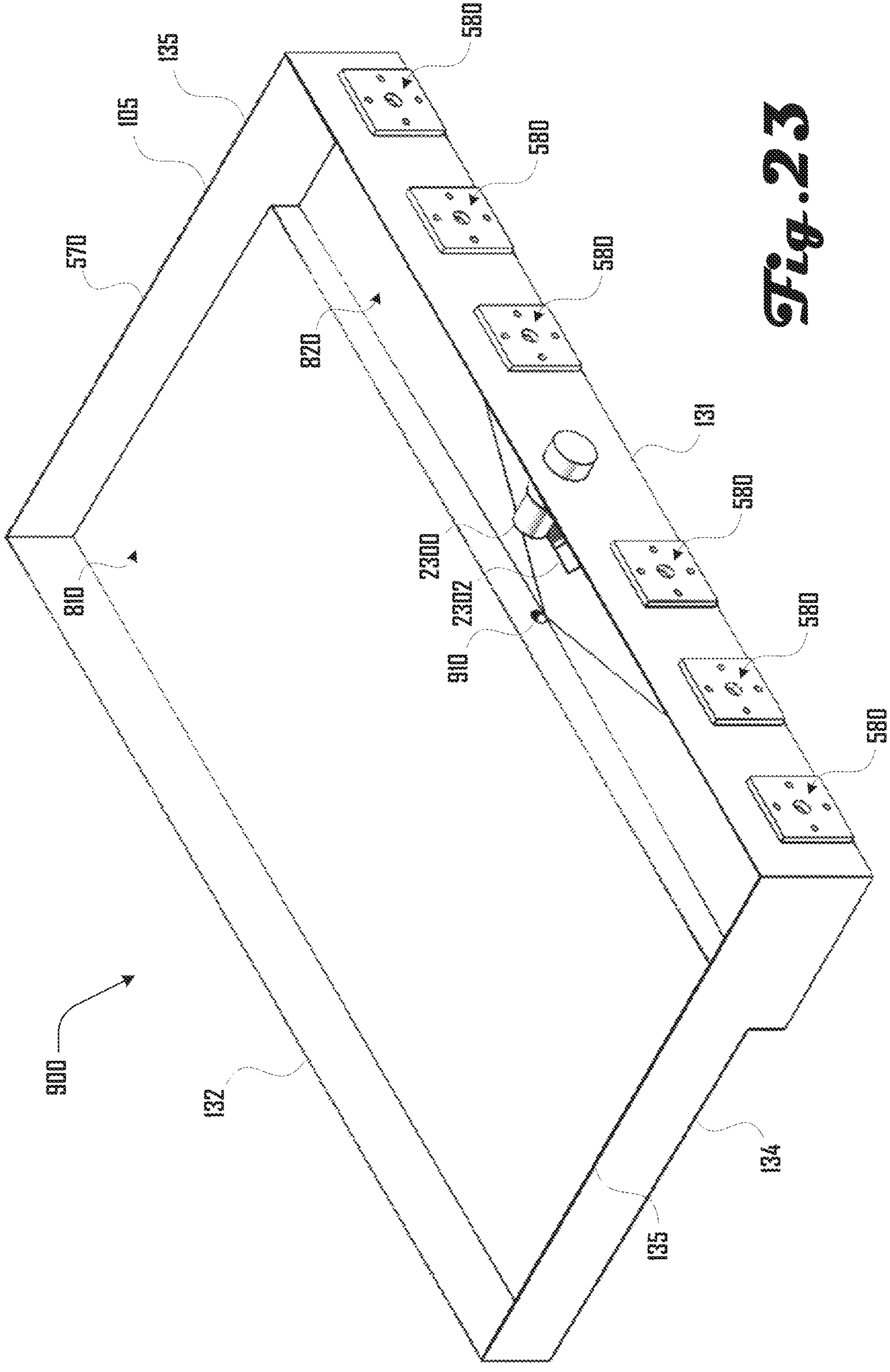
FIG. 23 illustrates a perspective view of an example embodiment of a housing base that comprises a float sensor assembly that includes a float sensor arm.

For example, FIGS. 23 and **24*a* illustrate an example embodiment of a housing base 900 that comprises a float sensor assembly 2300 that includes a float sensor arm 2302. The float sensor arm 2302 can be configured to float in fluid 595 present in the collection area 820, which can trigger operation of one or more sprayers 580 and/or a drain valve 575, or the like. For example, where a first threshold amount of fluid 595 is identified as being present in the collection area 820 (e.g., a first angle of the float sensor arm 2302), one or more sprayers 580 can be triggered to operate to remove fluid 595 from the collection area 820. However, if a second threshold amount of fluid 595 or rate of fluid increase in the collection area 820 is identified (e.g., an amount or rate that indicates one or more sprayers 580 are not able to remove fluid 595 at a sufficient rate), a drain valve 575 can be activated (see e.g., FIG. 24*b***).

Various suitable float sensor assemblies 2300 can be used in various embodiments. For example, a float sensor arm 2302 would have a horizontal form factor such that when the float sensor arm 2302 is angled down, sprayers 580 would not be active and when float sensor arm 2302 is horizontal, sprayers 580 would be active. In some examples, a float sensor assemblies 2300 can mount directly to the housing base 900 or other element with a seal, nut or the like. In some embodiments, the float sensor arm 2302 can be ~3.6" long with a float of the float sensor arm 2302 being about 2.1" long. In some embodiments, a float sensor assembly 2300 can comprise a vertical float sensor or other suitable sensor. In some embodiments, float sensor assembly 2300 and/or float sensor arm 2302 can be absent.

In various embodiments, one or more sprayers 580 and/or drain valves 575 can be triggered based on various suitable factors or data such as environmental conditions such as temperature, humidity, rain, snow, or the like. As discussed herein, in some embodiments, a drain valve 575, drain plug 910, sprayers 580, or the like, can be specifically absent.

Figure 10:
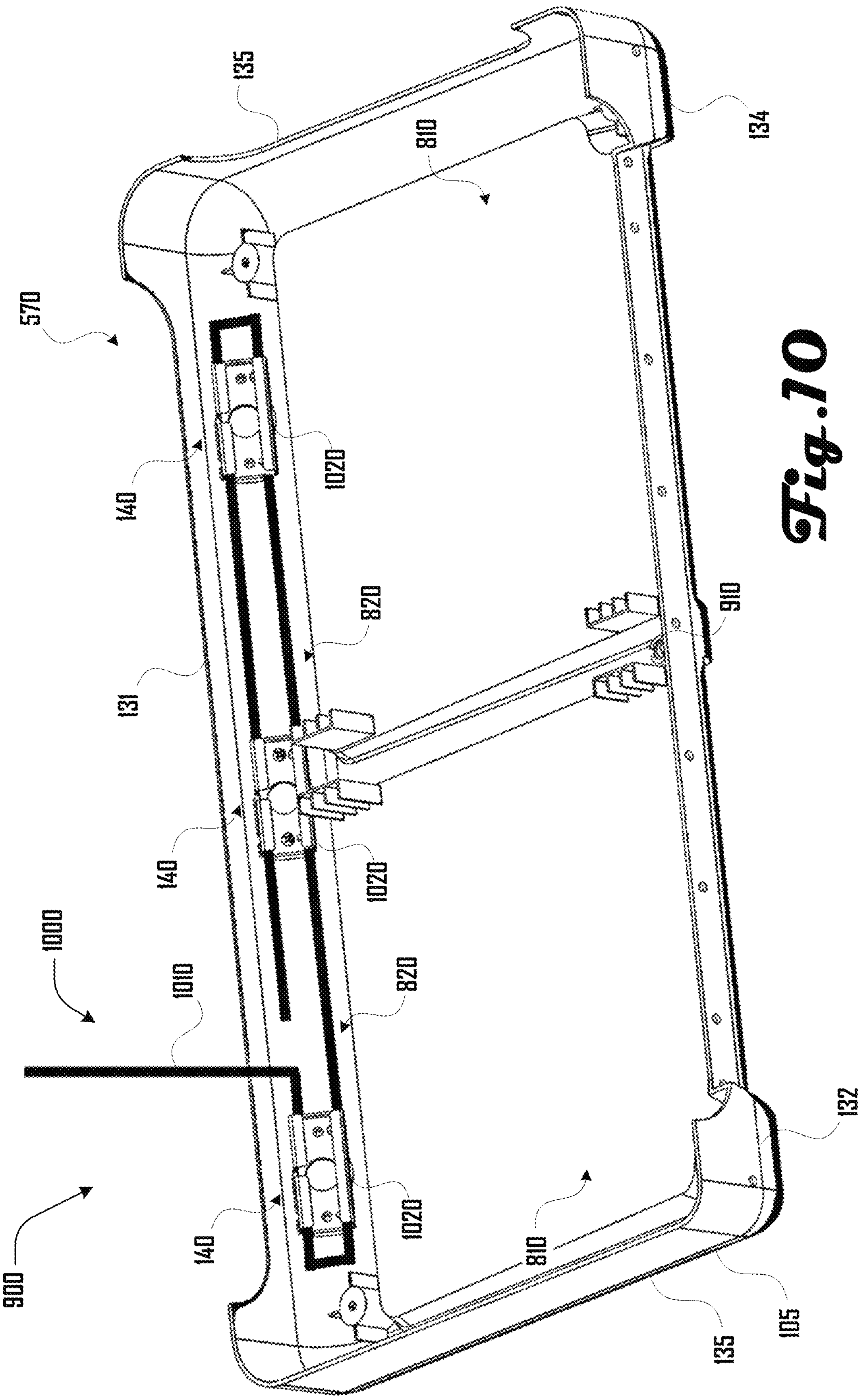
FIG. 10 illustrates an example perspective view of an embodiment of a housing base that comprises a heating assembly.
Figure 11:
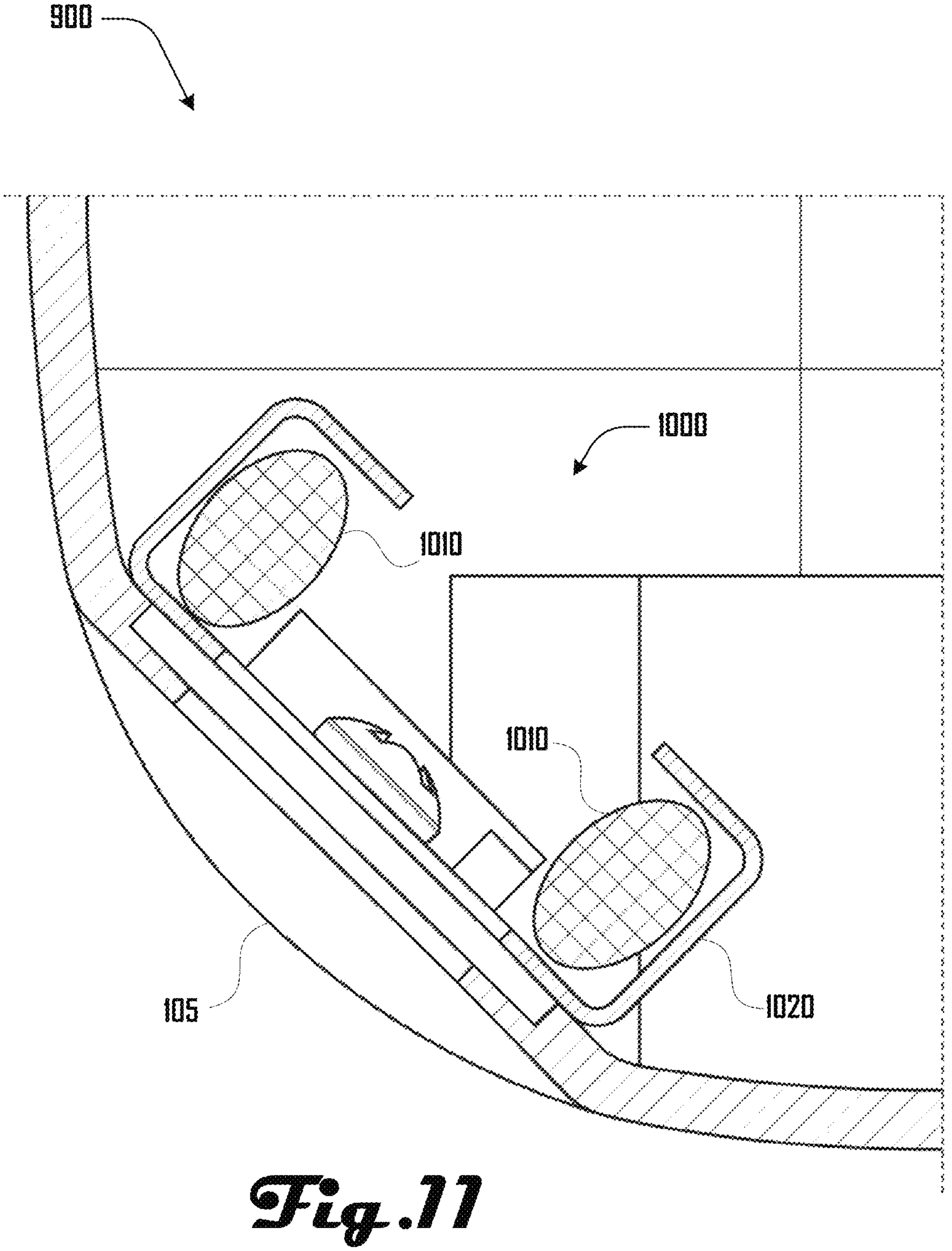
FIG. 11 illustrates an example side cutaway view of an embodiment of a housing base that comprises a heating assembly.

Additionally, in various embodiments it can be desirable to protect the sprayers 580 from freezing by providing one or more heaters with the heat pump system 100. For example, FIGS. 10 and 11 illustrate an example embodiment of a housing base 900 that comprises a heating assembly 1000. The heating assembly comprises a heating element 1010 that snakes within a plurality of brackets 1020 that define fluid ports 140. The heating element 1010 can be heated (e.g., via electric power) to heat the brackets 1020 along with heating sprayers 580 that can be associated with the brackets 1020, which can prevent fluid 595 proximate to the heating element 1010 from freezing, which may otherwise clog the sprayers 580, intake tube(s), or the like.

Figure 24A:
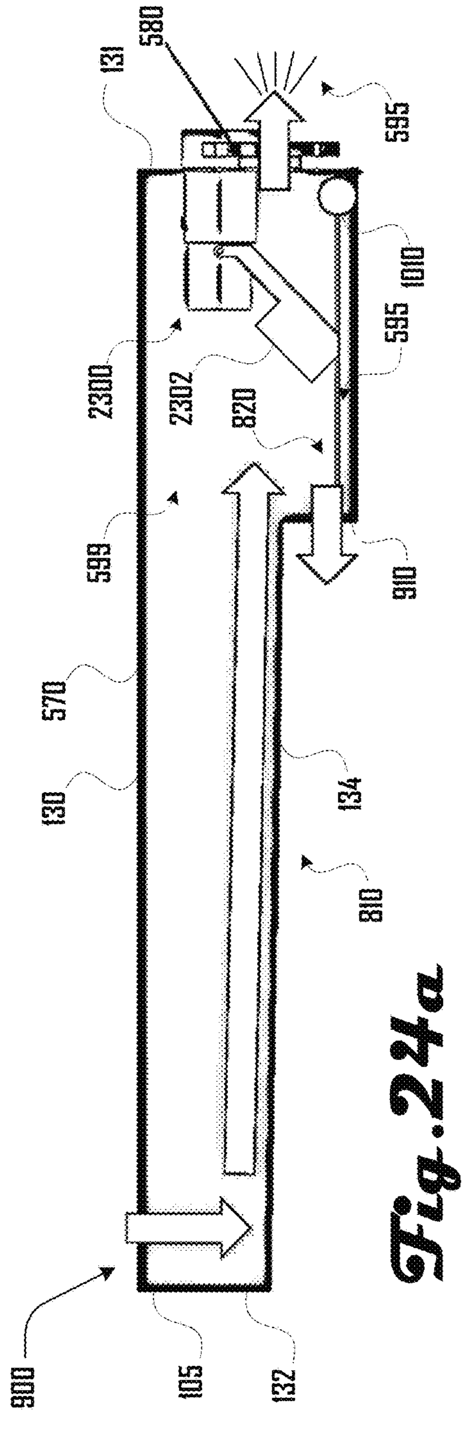
FIG. 24*a* illustrates a side cutaway view of an example embodiment of a housing base that comprises a float sensor assembly that includes a float sensor arm.
Figure 24B:
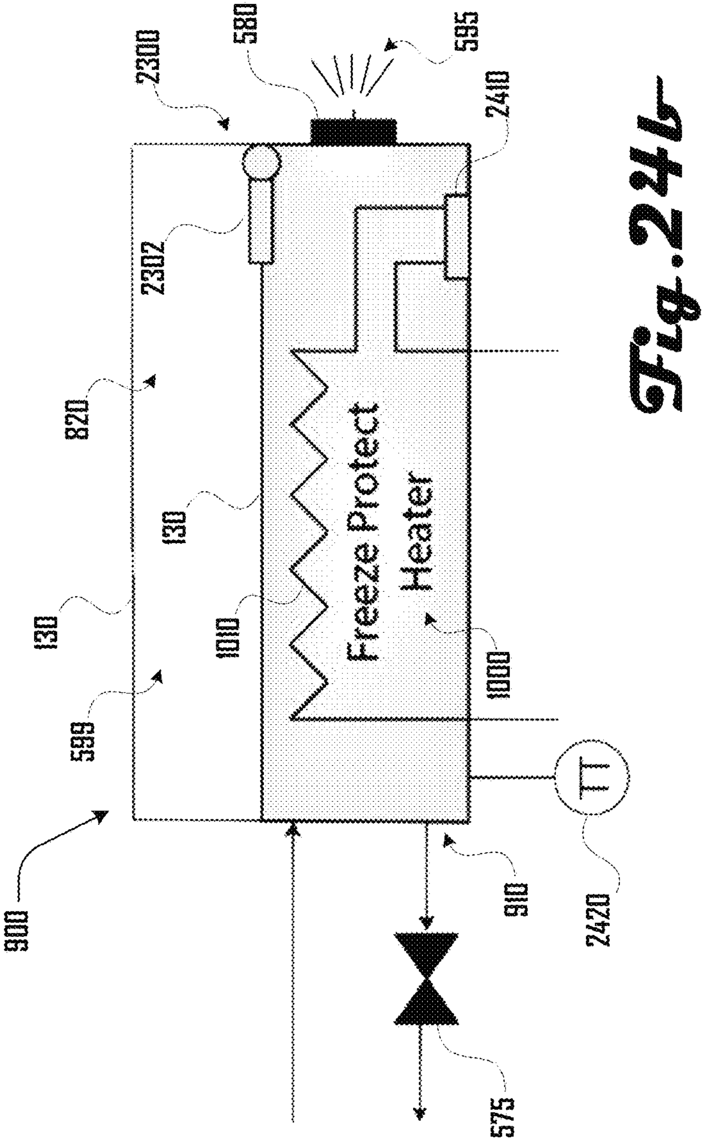
FIG. 24*b* illustrates a further example embodiment of a housing base that includes a heating assembly that comprises a heating element, a thermostat, and a thermistor.

FIG. 24*a* illustrates another example embodiment of a housing base 900 that comprises a heating element 1010. FIG. 24*b* illustrates a further example embodiment of a housing base 900 that includes a heating assembly 1000. In the example embodiment of FIG. 24*b*, the heating assembly 1000 comprises a heating element 1010, a thermostat 2410 and a thermistor 2420. In various embodiments, the thermostat 2410 can be a device that controls the operation of heating assembly 1000, that switches the heating element 1010 on and off as desired to maintain a temperature, temperature range or temperature threshold of fluid 595 within or about the collection area 820. In some embodiments, temperature data from the thermistor 2420 can be used as a signal to determine when to switch the heater on and off. A heating element 1010 can impart various amounts of energy including 5 W, 10 W, 15 W, 20 W, 30 W, 50 W, 75 W, 100 W, 150 W, 200 W, 300 W or the like.

Figure 25:
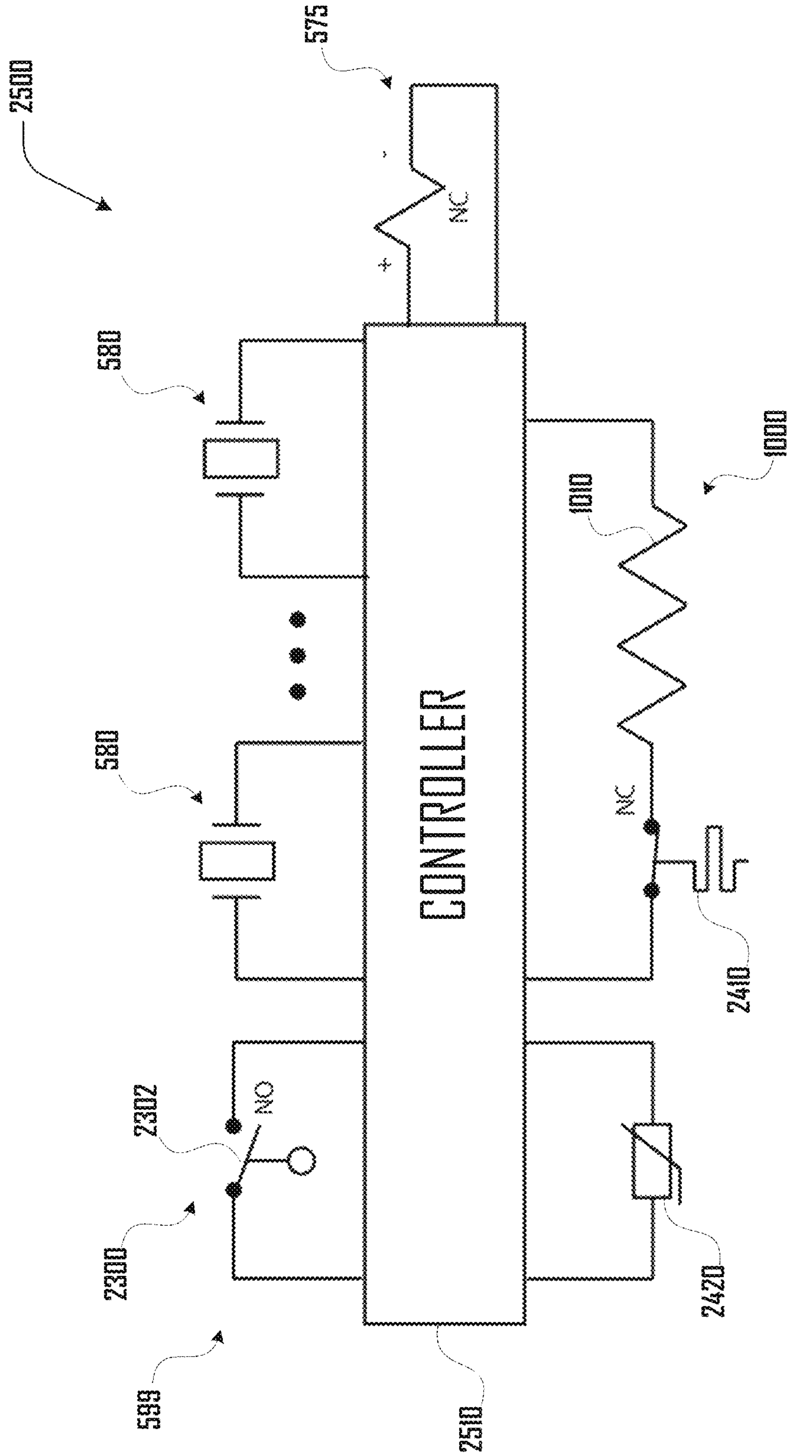
FIGS. 25 and 26 illustrate diagrams of example embodiments of a fluid management system.
Figure 26:
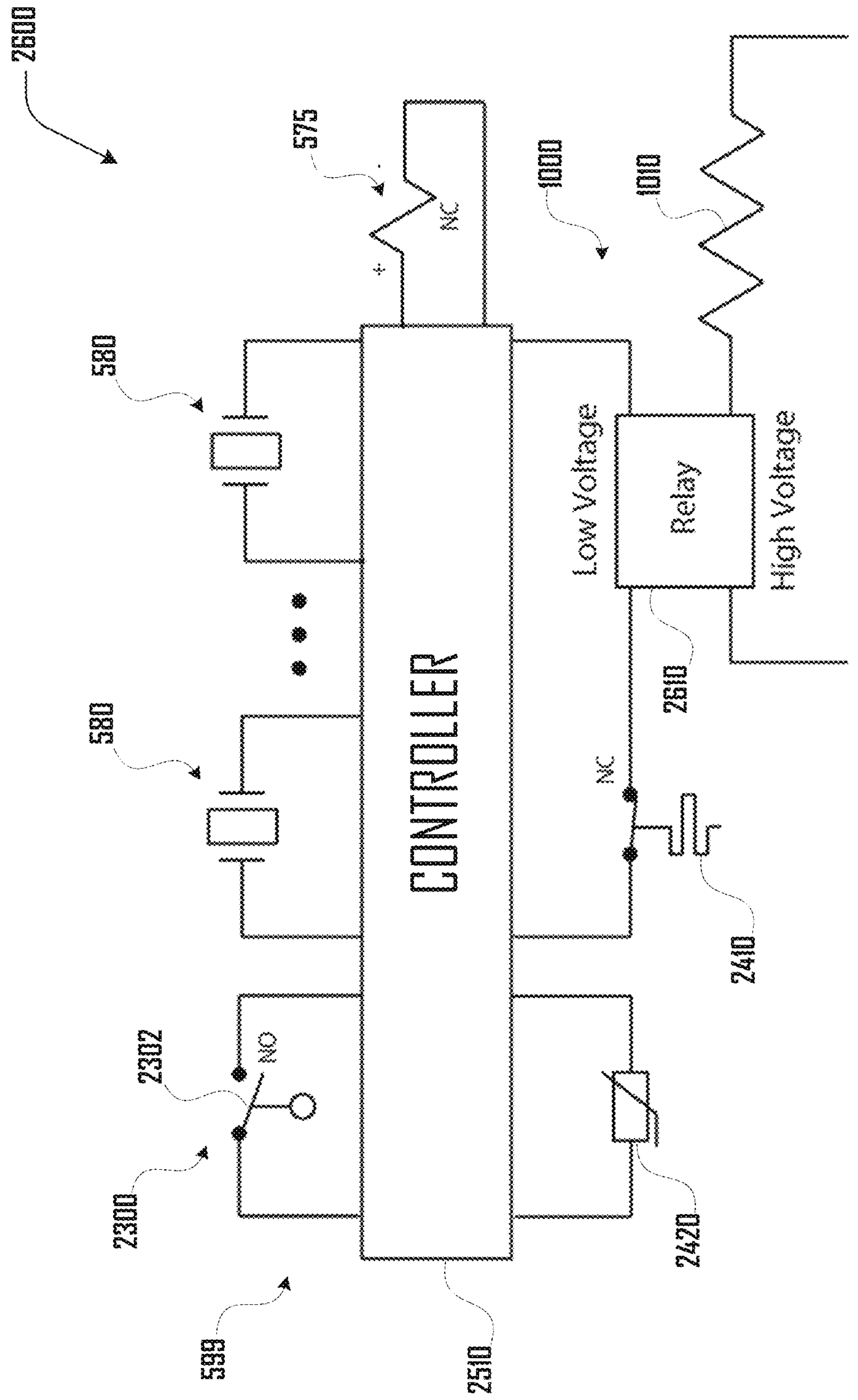

FIGS. 25 and 26 illustrate diagrams of example embodiments 2500, 2600 of a fluid management system. These examples include a controller 2501 (e.g., a PCBA) operably coupled to a plurality of sprayers 580, a float sensor assembly 2300 with a float sensor arm 2302, a thermostat 2410, a thermistor 2420, a heating assembly 1000 with a heating element 1010 and a drain valve 575. In the example embodiment 2600 of FIG. 26, the heating element 1010 is operably coupled with the controller via a relay 1610.

In various embodiments, a thermistor 2420 can connect to a PCBA or other suitable device and be used to monitor the temperature of water, liquid or fluid in the vicinity of the sprayers 580 (e.g., ultrasonic elements) and/or outdoor air temperature external to the external unit 130 so that a freeze-protect heater (e.g., heating assembly 1000) turns on at temperatures approaching 0° ° C. (e.g., 0.5° C., 1° C., 2° C., 3° C., or the like, or a range between such example values).

In various embodiments, the thermostat 2410 can comprise an over-temperature thermostat integrated into a heating assembly 1000 to prevent the heating element 1010 from reaching excessively high temperatures while running. For example, the thermostat 2410 in some examples can provide for over-temperature that opens at high threshold temperature and then re-closes at appropriately low temperature.

In various embodiments, a PCBA can be used to control the heating assembly 1000; however, in further embodiments, various suitable devices can be used to control the heating assembly 1000 such as a suitable computing system comprising a processor and memory storing instructions that can be executed by the processor.

A housing base 900 of an external unit 130 can be various suitable sizes. For example, in one preferred embodiment, the housing base 900 can be 25.5" in Length by 15" in Width and 3" in Height. In some embodiments, a housing base 900 can have a length of 15", 16", 17", 18", 19", 20", 21", 22", 23", 24", 25", 26", 27", 28", 29", 30", 31", 32", 33", 34", 35", or the like or a range between such example values. In some embodiments, a housing base 900 can have a width of 5", 6", 7", 8", 9", 10", 11", 12", 13", 14", 15", 16", 17", 18", 19", 20", 21", 22", 23", 24", 25", or the like, or a range between such example values. In some embodiments, a housing base 900 can have a height of 1.0", 1.5", 2.0", 2.5", 3.0", 3.5", 4.0", 4.5", 5.0", 5.5", 6.0", 6.5", 7.0", 7.5", 8.0", or the like, or a range between such example values. A housing base 900, slope 810, collection area 820, or the like, can be configured to hold various volumes of liquid including 1 L, 2 L, 3 L, 4 L, 5 L, 10 L, 15 L, or the like, or a range between such example elements. Such a housing base 900 and housing 105 can be made of various suitable materials, including plastic, metal, or the like. In various embodiments, the housing base 900 and/or external unit 130 can be sized to be small enough to fit through a window having a width of 16", 20", 24", 28", 32", 36", 40", 44", 48", 52", 56", or the like, or a range between such example values.

Figures 12A, 12B, 12C:
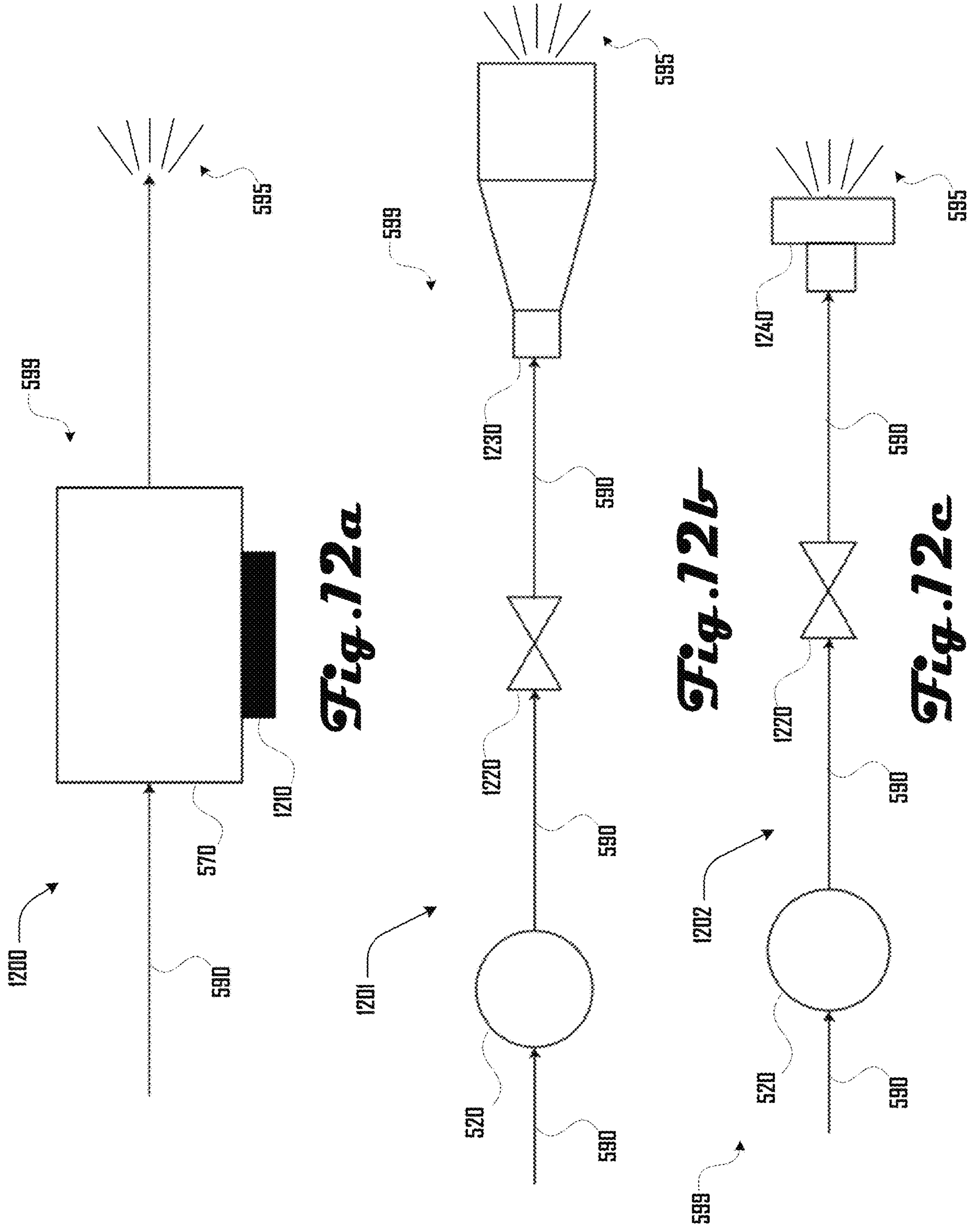

Turning to FIG. 12*a*, an example embodiment 1200 of a fluid handling system 599 is illustrated, which includes a fluid line 590 that transports fluid 595 (e.g., from an internal unit reservoir 510 as shown in FIGS. 5 and 6) to an external unit reservoir 570. In this example embodiment 1200, the external unit reservoir 570 comprises a vibration unit 1210 (e.g., a piezoelectric element, ultrasonic element, or the like) that introduces vibration to the external unit reservoir 570. Fluid 595 can be removed from the external unit reservoir 570 as discussed herein, such as via an active or passive port, drain, pump, nozzle, atomizer, mister, sprayer, fan (e.g., external unit fan 565), or the like.

Embodiments can include various suitable sprayers 580, which in some preferred embodiments can include perforated mesh ultrasonic elements such as an annular piezoelectric element that is attached to thin metal film with numerous small perforations (e.g., 5 μm, 10 μm, 15 μm in diameter). Such a piezoelectric element can vibrate at various suitable frequencies (e.g., 90-110 kHz, 85-115 kHz, 80-120 kHz) and water, liquid or fluid in contact with a (e.g., metal) film can be moved through the perforations to atomize the water, liquid or fluid.

In some embodiments, sprayers 580 (e.g., perforated ultrasonic elements) can be mechanically clamped into place for mounting/sealing. In various embodiments, one or more sprayers 580 can have a 20 mm outer diameter (OD) and a resonant frequency of 90 kHz and can come with silicone sleeve to place around the sprayer 580 for mounting. A sprayer 580 of some embodiments can have an OD of 15 mm, 16 mm, 17 mm, 18 mm, 19 mm, 20 mm, 21 mm, 22 mm, 23 mm, 24 mm, 25 mm, or the like or a range between such example values. A sprayer 580 of some embodiments can have a resonant frequency of 50 kHz, 60 kHz, 70 kHz, 80 kHz, 90 kHz, 100 kHz, 110 kHz, 120 kHz, 130 kHz, 140 kHz, 150 kHz, or the like or a range between such example values. A sprayer 580 of some embodiments can consume 0.1 W, 0.5 W, 1.0 W, 1.5 W, 2.0 W, 2.5 W, 3.0 W of power in some examples or the like or a range between such example values. A sprayer 580 of some embodiments can have various suitable filter sizes including 4.5 μm mesh size, 5.0 μm mesh size, 5.5 μm mesh size, 6.0 μm mesh size, 6.5 μm mesh size, 7.0 μm mesh size, 7.5 μm mesh size, 8.0 μm mesh size, 8.5 μm mesh size, 9.0 μm mesh size, 10.0 μm mesh size, 11.0 μm mesh size, 12.0 μm mesh size, 13.0 μm mesh size, 14.0 μm mesh size, 15.0 μm mesh size or the like, or a range between such example values. One preferred embodiment includes use of a sprayer with 7.5 μm mesh size or between 7.0 μm mesh size and 8.0 μm mesh size.

A sprayer 580 of some embodiments can have various suitable flow rates, including 3.0 mL/min, 3.5 mL/min, 4.0 mL/min, 4.5 mL/min, 5.0 mL/min, 5.5 mL/min, 6.0 mL/min, 6.5 mL/min, 7.0 mL/min, 7.5 mL/min, 8.0 mL/min, 8.5 mL/min, 9.0 mL/min, or the like, or a range between such example values. In some embodiments, a sprayer 580 can operate with various suitable (e.g., nozzle) pressures such as 100 psig, 90 psig, 80 psig, 70 psig, 60 psig, 50 psig, 40 psig, 30 psig, 20 psig, 10 psig, or the like, or a range between such example values (e.g., based on the pressure regulator). In some preferred embodiments, a sprayer 580 can operate at equal to or less than 42.4 V peak limit (84.8 V peak-to-peak).

In some embodiments, a sprayer 580 can operate at equal to or less than 21.2 V peak limit. In some embodiments, a sprayer 580 can operate at driving voltage of 39-40 V. In some embodiments, a sprayer 580 can operate at driving voltage of 35, 36, 37, 38, 39, 40, 41 or 42 V, or a range between such example values.

In one preferred embodiment, a heat pump system 100 has exactly three sprayers 580 with 13 μm mesh size (between 12.0 μm mesh size and 14.0 μm mesh size) operating at about 20 V peak (<21.2 V peak) to generate a spray rate of at least 6.67 L/day at 0° C. and a spray rate of at least 11.2 L/day at 30° C. In one embodiment, a heat pump system 100 has exactly three sprayers 580 with 7.5 μm mesh size (between 7.0 μm mesh size and 8.0 μm mesh size) operating at 40 V peak (<42.4 V peak) to generate a spray rate of at least 6.67 L/day at 0° C. and a spray rate of at least 11.2 L/day at 30°. In various embodiments, such configurations are not obvious design choices or optimizations and are instead specifically chosen to generate sufficient and suitable fluid release, such as to ensure or prevent overflow of an external unit reservoir 570, or the like.

Turning to FIG. 12*b*, another example embodiment 1201 of a fluid handling system 599 is illustrated, which includes a fluid pump 520 that pumps fluid 595 through a throttling valve 1220 via a fluid line 590 where fluid 595 is expelled via a nozzle 1230, which may include an active or passive port, drain, pump, atomizer, mister, sprayer or the like. In some embodiments, such fluid 595 can be expelled to the outside of an external unit 130 of a heat pump system 100, into an external unit reservoir 570, or the like. In some embodiments the fluid 595 can originate from an internal unit reservoir 510, an external unit reservoir 570, or the like. FIG. 12*c* illustrates a similar embodiment 1202 comprising a rotary atomizer 1240.

Figure 13:
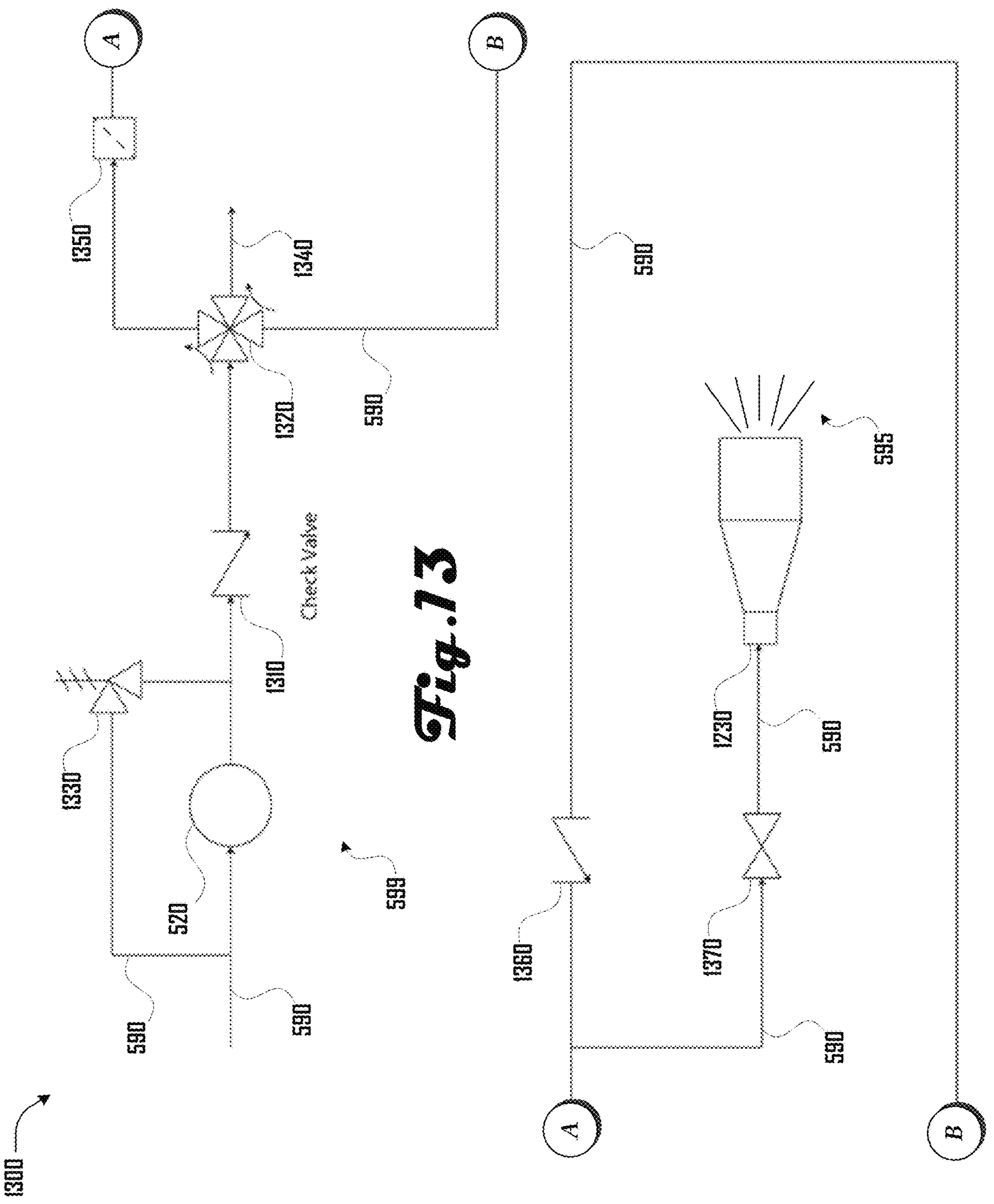
FIG. 13 illustrates another example embodiment of a fluid handling system.

Turning to FIG. 13, another example embodiment 1300 of a fluid handling system 599 is illustrated, with the diagram being split into two parts, where elements A, B illustrate where the diagram is split. This example 1300 includes a fluid pump 520 that pumps fluid 595 to a check valve 1310 and a four-way valve 1320 (e.g., solenoid valve). In some embodiments, the fluid can comprise debris as discussed herein. A relief valve 1330 can be operably coupled to portions of fluid line 590 before and after the fluid pump 520. The four-way valve 1320 can be configured to direct fluid to a fluid/debris release 1340 or a first section of fluid line 590 leading first to a debris filter 1350 that further leads to branches that respectively have a check valve 1360 and a two-way valve 1370 (e.g., solenoid valve) that leads to a nozzle where fluid 595 can be expelled.

Figure 14:
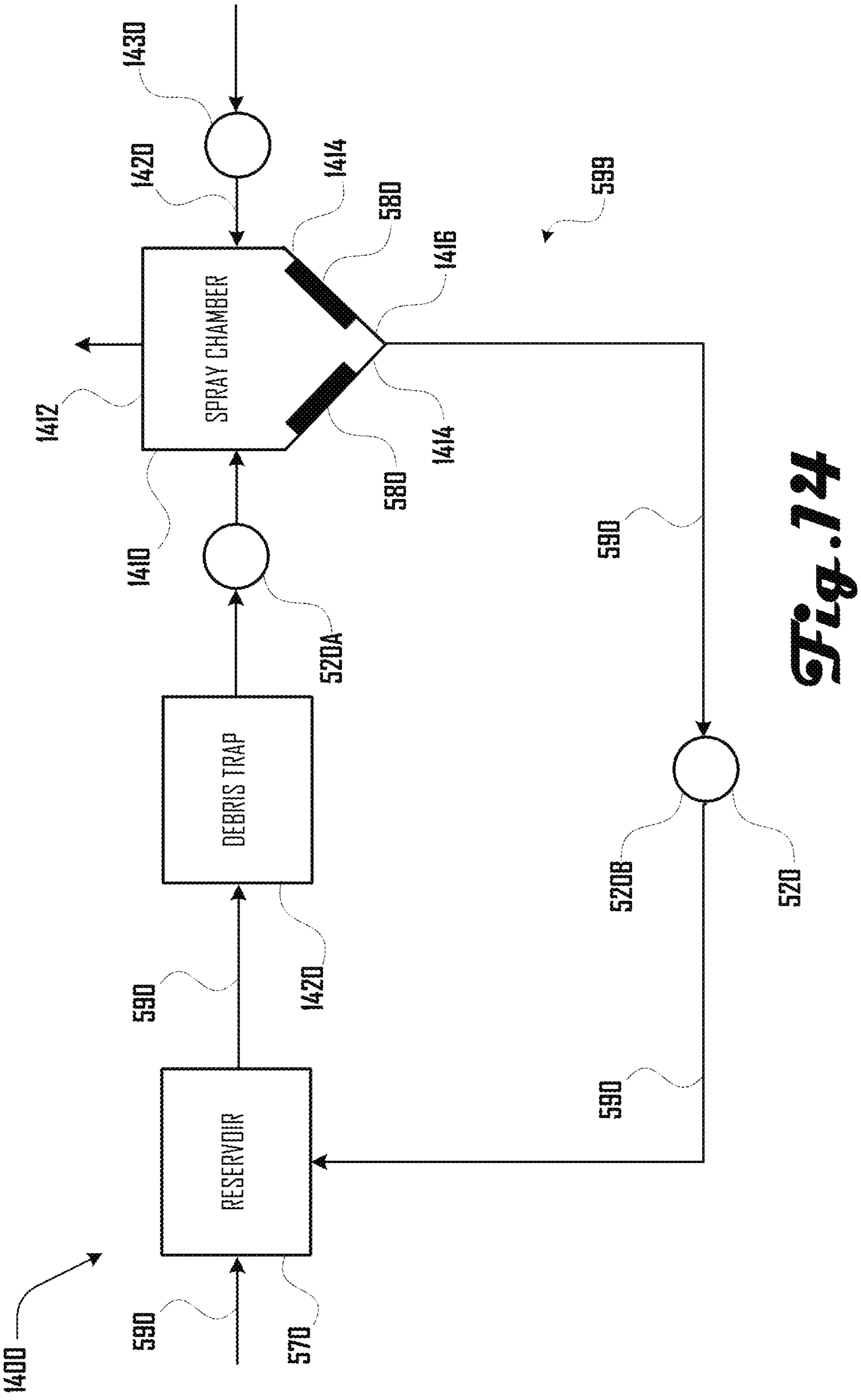
FIG. 14 illustrates another example embodiment of a fluid handling system that comprises an external unit reservoir configured to store fluid.

Turning to FIG. 14, another example embodiment 1400 of a fluid handling system 599 is illustrated, which comprises an external unit reservoir 570 configured to store fluid 595, which in some embodiments can comprise debris (e.g., particulate matter, or the like). Fluid from the external unit reservoir 570 and can be pumped into a spray chamber 1410 through a debris trap 1420 (e.g., a filter, trap, or the like) via a first fluid pump 520A and fluid lines 590. In various embodiments, the debris trap 1420 can comprise a removable filter or trap for debris, which can allow debris present in the fluid 595 to be removed, filtered out, or the like. In various embodiments, one or more filters or debris traps 1420 of the system 100 can have various suitable pore size such as 10 μm, 20 μm, 40 μm, 60 μm, 100 μm, 150 μm, 200 μm, 250 μm, 300 μm, and the like or a range between such example values. In some embodiments, it may be desirable for elements of the system 100 to be connected via fluid lines 590 (e.g., tubing) of a size to help prevent debris from building up at locations other than filters, debris traps or other desired location. For example, fluid lines 590 of certain sections can be greater than ½", ¾", 1", 1.25", 1.5" or the like or a range between such values.

Air can also be pumped into the spray chamber 1410 via air lines 1420 and an air pump 1430. The air and fluid 595 (e.g., liquid) from the external unit reservoir 570 can be combined at a pair of sprayers 580 (e.g., atomizers, misters, sprayers, or the like) to generate a spray, mist, or the like in the spray chamber 1410, which can be expelled from a port 1412 of the spray chamber 1410. In some embodiments, the spray chamber 1410 can comprise a fan to assist with expulsion of liquid and/or air and the like.

In various embodiments, the spray chamber 1410 can comprise a pair of opposing sidewalls 1414 (e.g., at 45 degrees and 90 degrees to each other) with the sprayers 580 disposed on respective opposing sidewalls 1414. In some embodiments, the sprayers 580 can be disposed on an incline to help prevent debris from being deposited on the sprayers 580, on the sidewalls 1414, or the like. In some embodiments, the sidewalls 1414 can be disposed at any suitable angle such as 10°, 15°, 20°, 25°, 30°, 35°, 40°, 45°, 50°, 55°, 60°, 65°, 70°, 75°, 80°, or the like, or a range between such example values. The spray chamber 1410 can further comprise a basin 1416 in which fluid can collect and be pumped back to the external unit reservoir 570 via a second fluid pump 520B and a set of fluid lines 590. However, in some embodiments, a fluid basin 1416 and/or associated fluid lines 590 and second fluid pump 520B can be absent.

Figure 15:
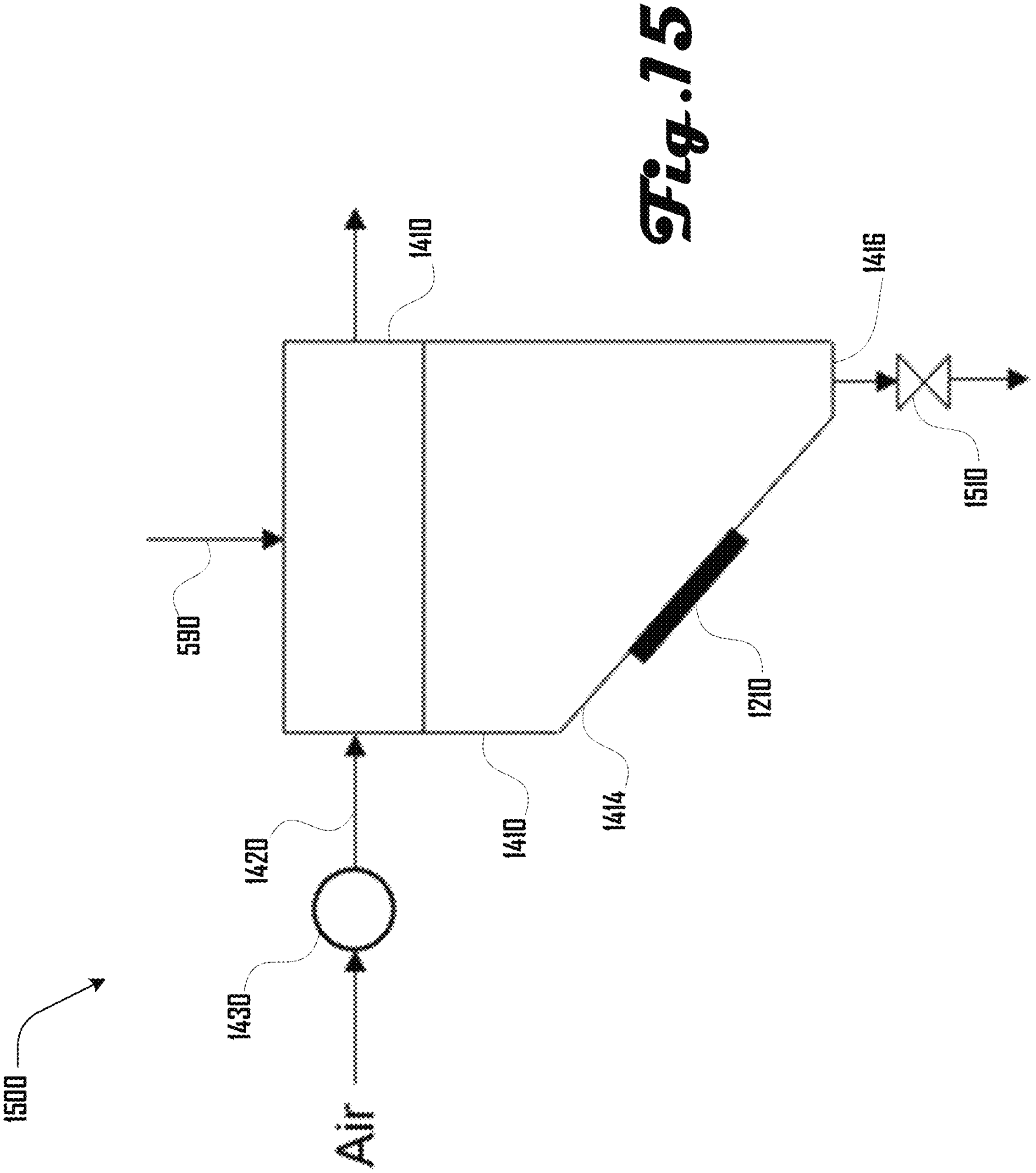
FIG. 15 illustrates another example embodiment of a fluid handling system that comprises a spray chamber that obtains fluid from a fluid line and obtains air from an air line via an air pump.

Turning to FIG. 15, another example embodiment 1500 of a fluid handling system 599 is illustrated, which comprises a spray chamber 1410 that obtains fluid 595 (e.g., liquid) from a fluid line 590 (e.g., pumped from an external unit reservoir 570 as discussed herein) and obtains air from an air line 1420 via an air pump 1430. The air and fluid 595 (e.g., liquid) combined in various suitable ways (e.g., via sprayers 580) to generate a spray, mist, or the like in the spray chamber 1410, which can be expelled from a port 1412 of the spray chamber 1410. In some embodiments, the spray chamber 1410 can comprise a fan to assist with expulsion of liquid and/or air and the like.

In this example embodiment 1500, the spray chamber 1410 comprises a vibration unit 1210 (e.g., a piezoelectric element, ultrasonic element, or the like) that introduces vibration to the spray chamber 1410. Such a vibration unit 1210 can be disposed on a sidewall 1414 of the spray chamber 1410, which can be sloped as discussed herein. Some embodiments can include a single sloped sidewall 1414, a plurality of sloped sidewalls 1414 (see e.g., FIG. 14), or the like. The spray chamber 1410 can further comprise a basin 1416 in which fluid and/or debris can collect. In various embodiments, the vibration unit 1210 can be configured to dislodge fluid, frozen fluid, debris, or the like, and direct such material to the basin 1416 via gravity.

Fluid 595 and/or debris can be removed from the spray chamber 1410 as discussed herein, such as via an active or passive port, drain, pump, nozzle, atomizer, mister, sprayer or the like. For example, the embodiment 1500 of FIG. 15 illustrates an example comprising a valve 1510 coupled to the basin 1416 that allows fluid and/or debris to be flushed from the spray chamber 1410, sent to an external unit reservoir 570, or the like.

Figure 16A:
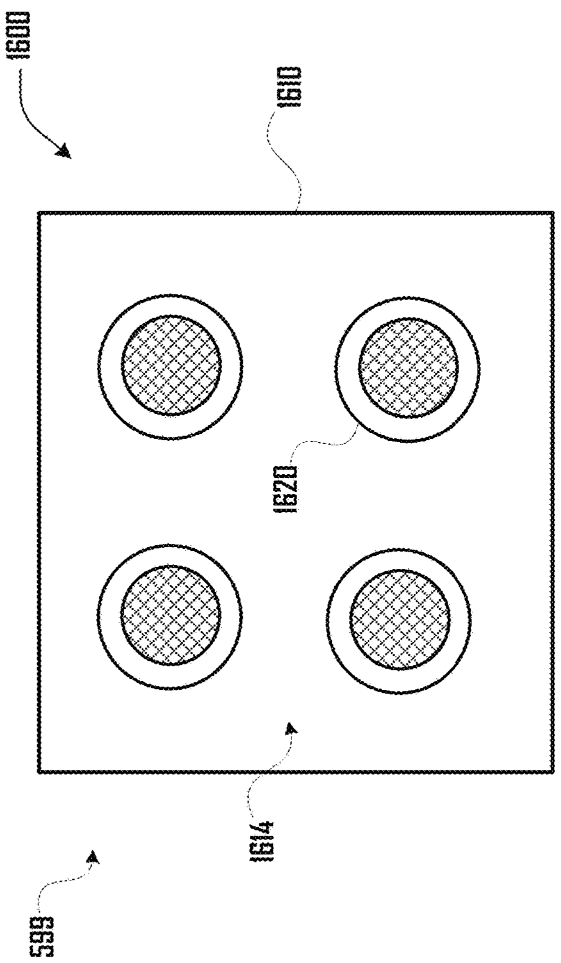
FIGS. 16*a* and 16*b* illustrate example embodiments of a floating platform that comprises a platform housing and plurality of ultrasonic elements with filters around the platform housing.
Figure 16B:
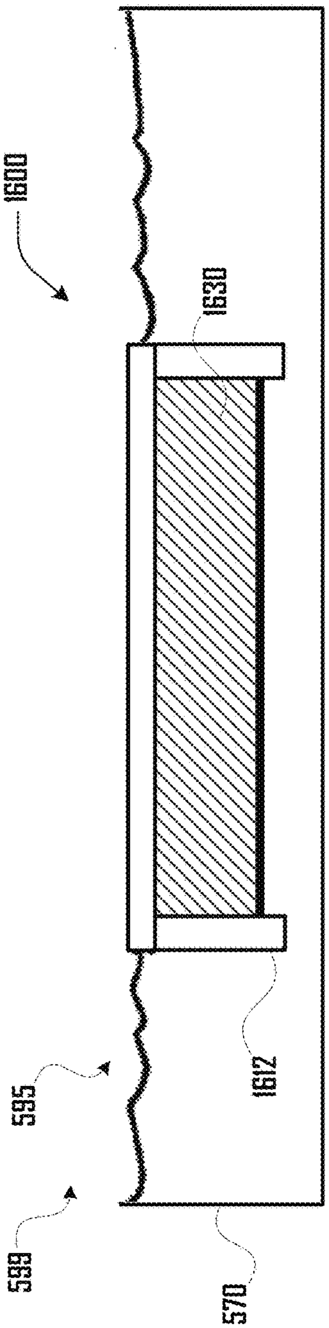

Turning to FIGS. 16*a* and 16*b*, an example embodiment of a floating platform 1600 is illustrated, which comprises a platform housing 1610 and plurality of ultrasonic elements 1620 (e.g., ultrasonic atomizers, sprayers, misters, or the like) with filters 1630 around the platform housing 1610, which in some embodiments can be desirable for debris mitigation. For example, the floating platform 1600 can have a rectangular housing 1610 that floats within fluid 595 in an external unit reservoir 570 and/or set of feet 1612 of the housing 1610 that rests on a base of the external unit reservoir 570. In various embodiments, the ultrasonic elements 1620 can intake and expel fluid from within a platform cavity 1614, with filters 1630 (e.g., screens, or the like), configured to filter debris that may be present within the fluid 595 of the external unit reservoir 570 from entering the platform cavity 1614, which could clog the ultrasonic elements 1620.

In some embodiments, a fluid management system can be integrated into an external unit 130 of a heat pump system 100. For example, fluid 595 (e.g., meltwater, condensation, or the like) can drain into a removal system in one or more separate compartments below heat pump components (e.g., into one or more external unit reservoir 570). In some embodiments, such an example can create less chance of water droplets re-freezing onto a heat exchanger or heat exchanger components when dispersed. In some examples, there may be fewer components in a housing of the external unit 130 restricting airflow through an external unit heat exchanger 535, which can make use of an external unit reservoir 570 that is an integral portion of a housing 105 of the external unit 130 desirable. In some examples, if a compressor is located below a fan/coil, such a configuration can take advantage of waste heat of the system to keep residual fluid (e.g., meltwater) in liquid form during operation.

Figure 17A:
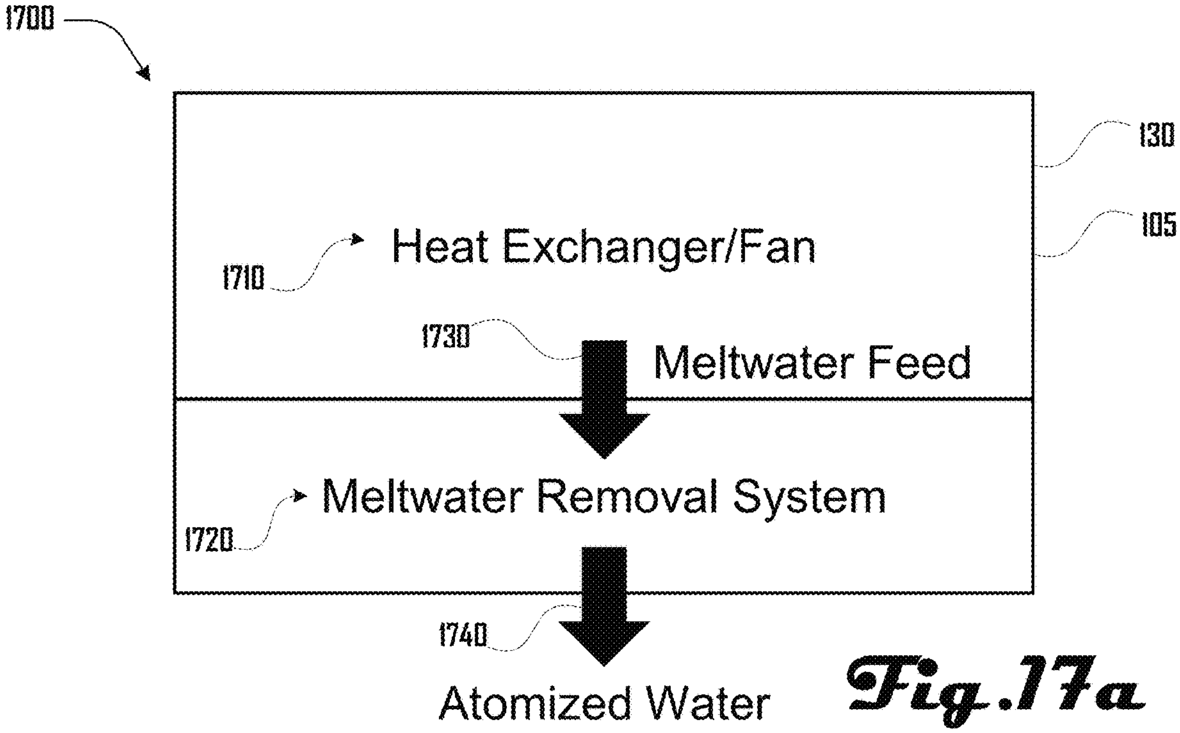
FIG. 17*a* illustrates an example of an embodiment where a housing of an external unit comprises a heat exchanger/fan disposed over a meltwater removal system that receives fluid via a meltwater feed.

For example, FIG. 17*a* illustrates an example of an embodiment where a housing 105 of an external unit 130 comprises a heat exchanger/fan 1710 disposed over a meltwater removal system 1720 that receives fluid 595 (e.g., meltwater) via a meltwater feed 1730. The received fluid 595 (e.g., meltwater) can be removed from the housing 105 of the external unit 130 as atomized water (e.g., fluid 595 in the form of a spray, mist, or the like).

Figure 17B:
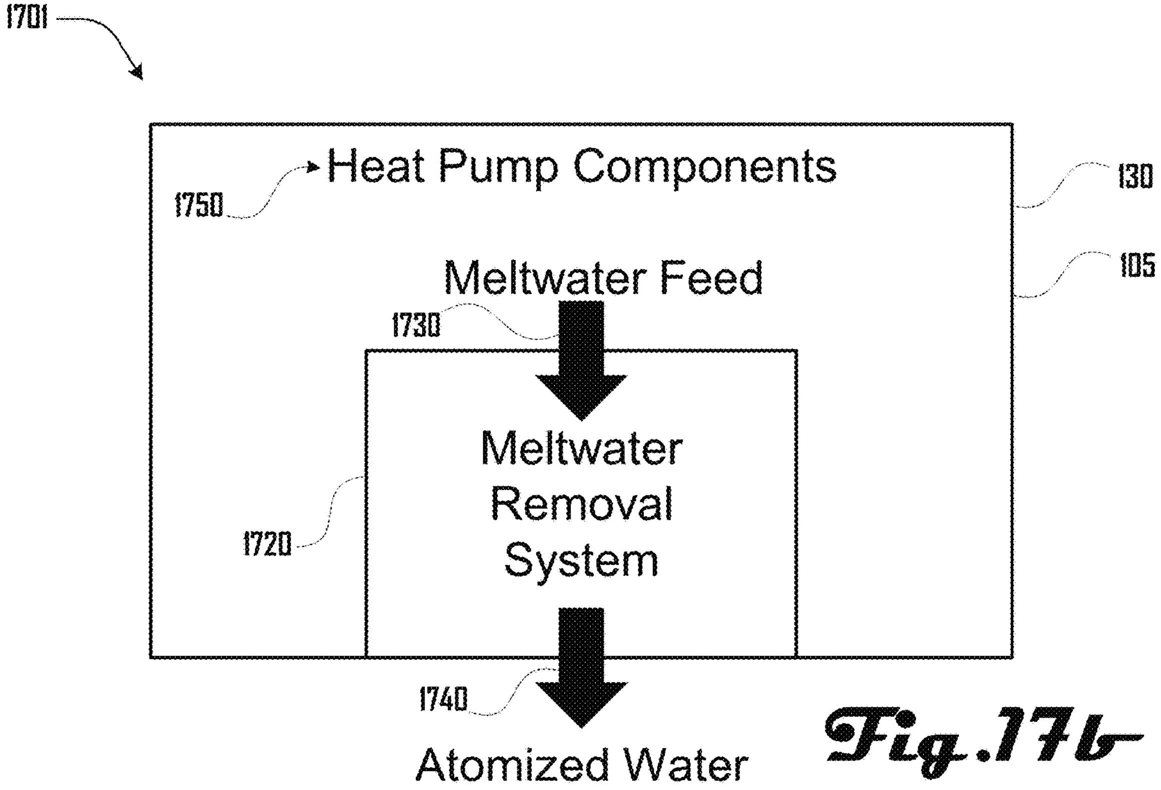
FIG. 17*b* illustrates an example of an embodiment where fluid can feed into a meltwater removal system in the same enclosure as heat pump components.

In some embodiments, fluid (e.g., meltwater) can feed (e.g., gravity, pump driven, or the like) into a meltwater removal system 1720 in the same enclosure as heat pump components 1750 as shown in the example of FIG. 17*b*. The received fluid 595 (e.g., meltwater) can be removed from the housing 105 of the external unit 130 as atomized water (e.g., fluid 595 in the form of a spray, mist, or the like).

In some embodiments, an external unit fan 565 or other suitable fan of the external unit 130 can be used to disperse fluid 595. In some embodiments, the external unit 130 can only comprise a single external unit fan 565, without other separate fans for dispersal or removal of fluid 595. Such a configuration in some examples can provide a more compact external unit housing 105. Various embodiments can take advantage of any waste heat from a coil of the external unit 130 to keep meltwater liquid (e.g., during defrost).

In some embodiments, sprayers 580 (e.g., atomizing elements, misters, spraying elements, or the like) may become clogged with debris which may be present in fluid 595 as discussed herein. In some such examples, it can be desirable to unclog such sprayers in various suitable ways including via an unclogging cycle.

Figure 18A:
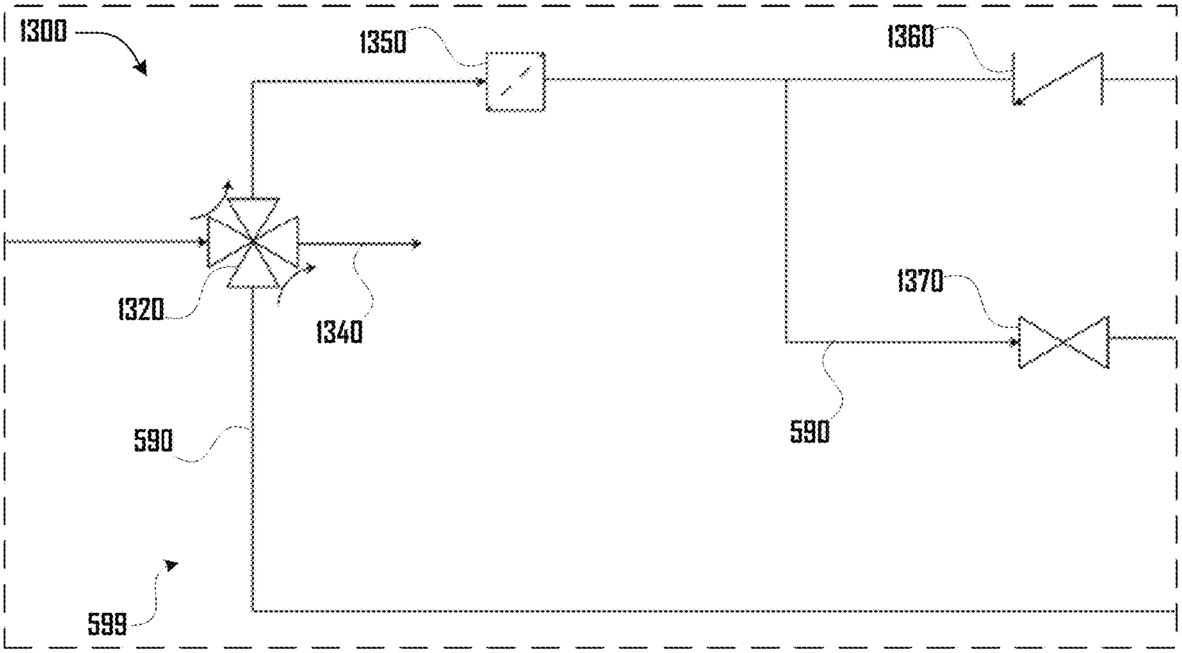
FIG. 18*a* illustrates one example embodiment of a normal operation configuration of a fluid handling system embodiment.
Figure 18B:
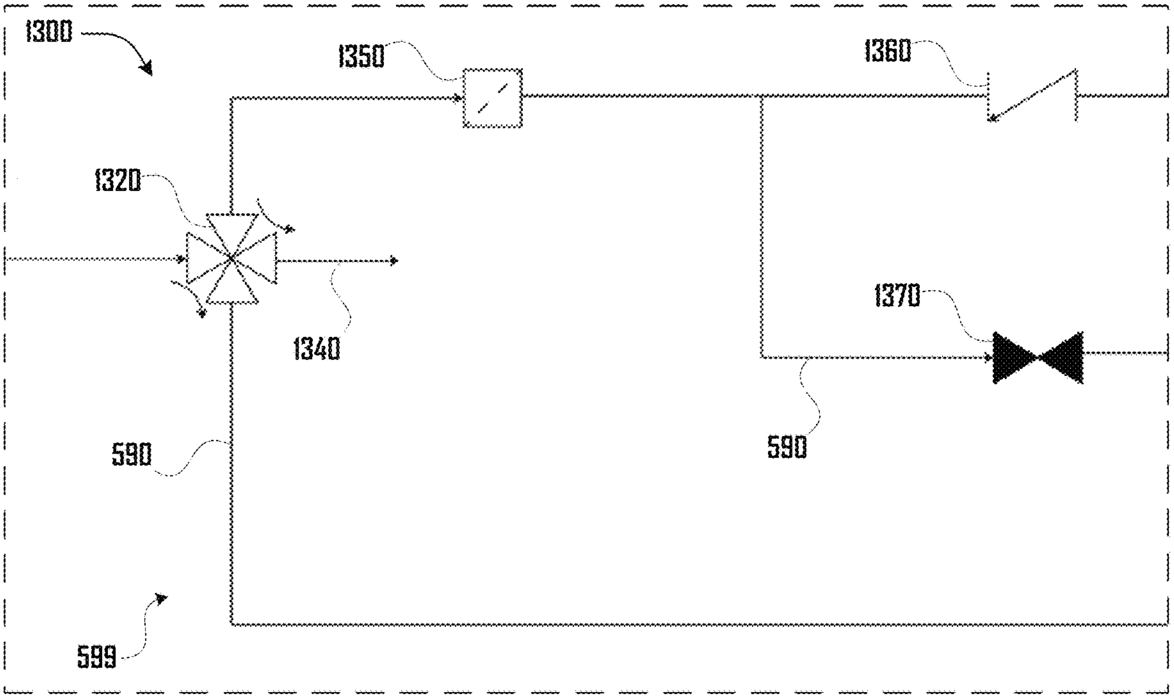
FIG. 18*b* illustrates one example embodiment of an unclogging configuration of the fluid handling system embodiment of FIG. 18*a*.

For example, FIG. 18*a* illustrates one example embodiment of a normal operation configuration of the fluid handling system 599 embodiment 1300 of FIG. 13 and FIG. 18*b* illustrates one example embodiment of an unclogging configuration of the fluid handling system 599 embodiment 1300. In the configuration of FIG. 18*a*, the four-way valve 1320 (e.g., solenoid valve) is in a first configuration and the two-way valve 1370 (e.g., solenoid valve) is in an open configuration. In the configuration of FIG. 18*b*, the four-way valve 1320 is in a second configuration and the two-way valve 1370 is in a closed configuration.

Figure 19A:
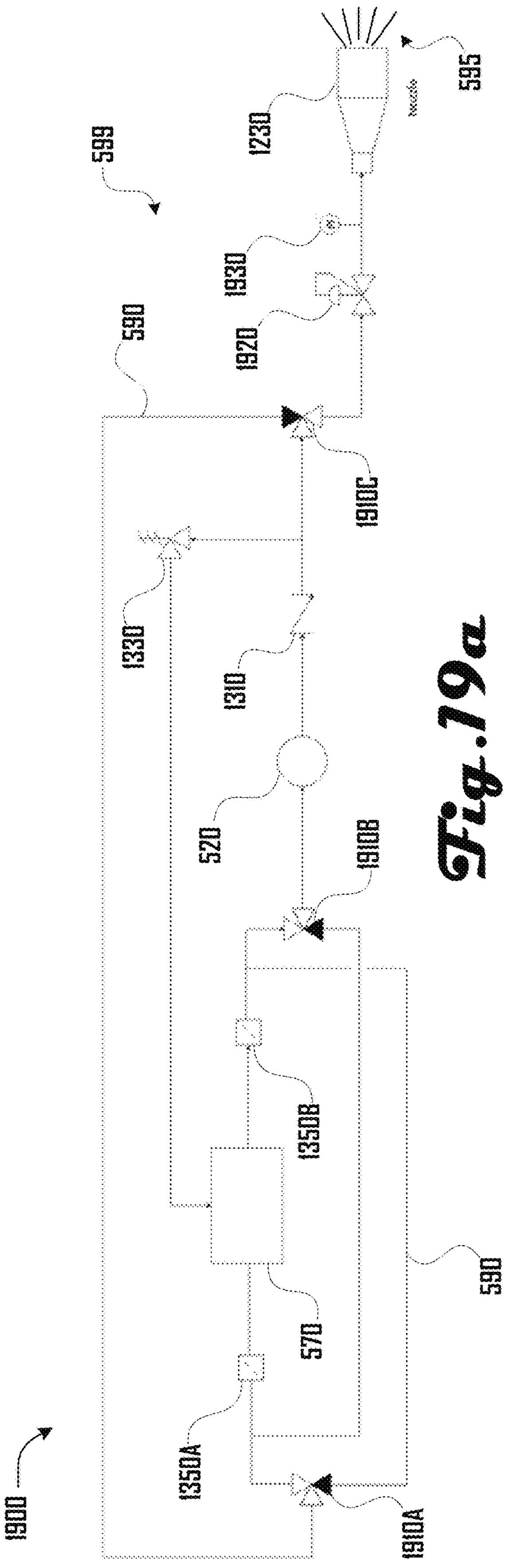
FIG. 19*a* illustrates an example embodiment of a fluid handling system in a first configuration.
Figure 19B:
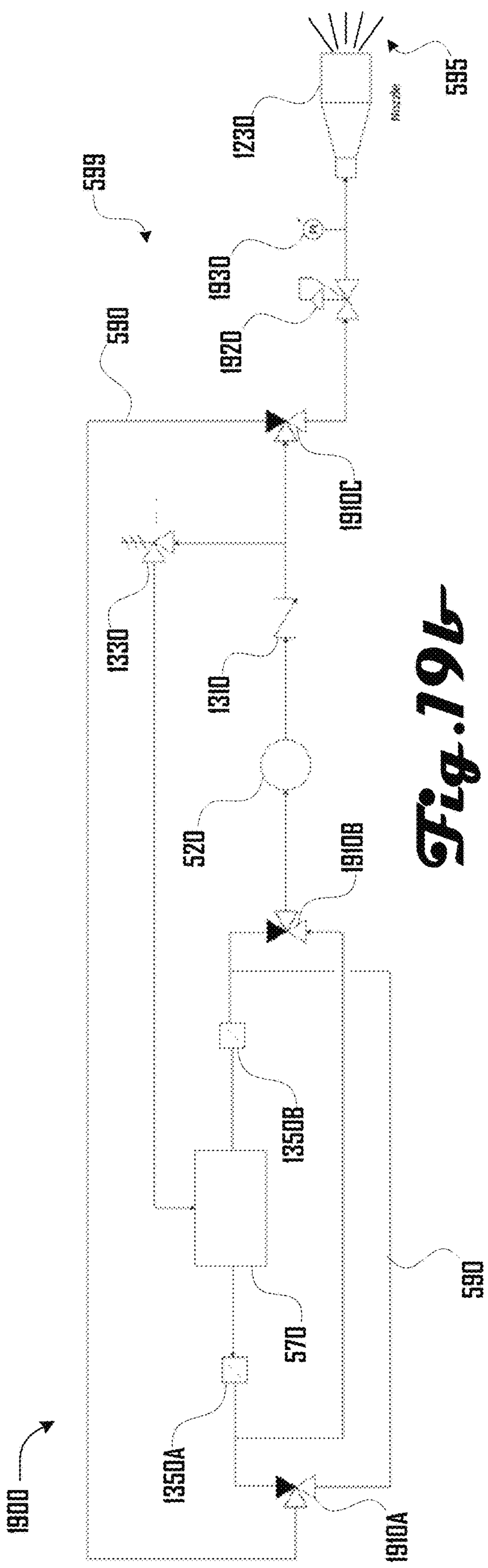
FIG. 19*b* illustrates the example embodiment of the fluid handling system of FIG. 19*a* in a second configuration.
Figure 20:
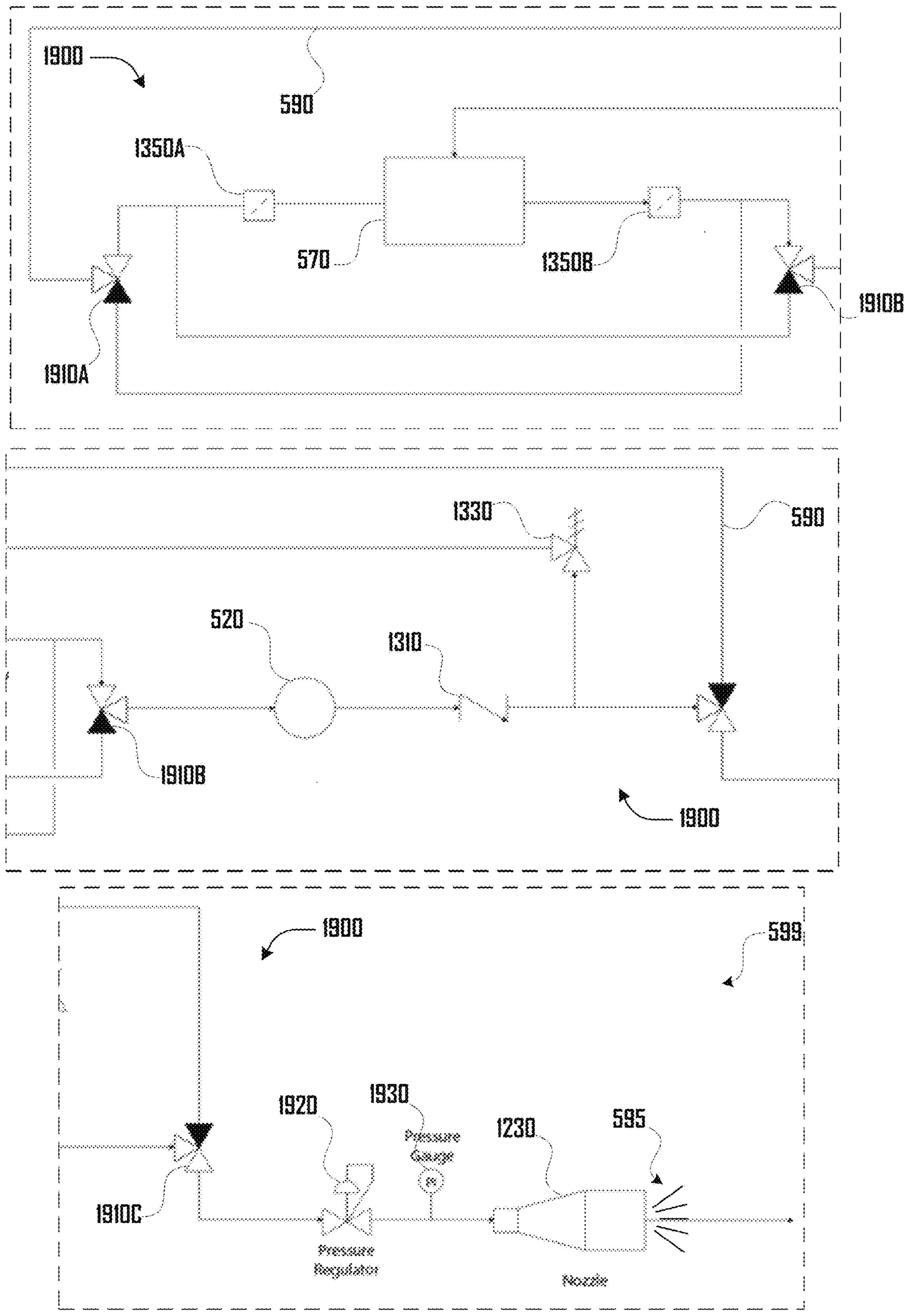
FIG. 20 illustrates an enlarged and broken up version of the configuration of FIG. 19*a*.
Figure 21:
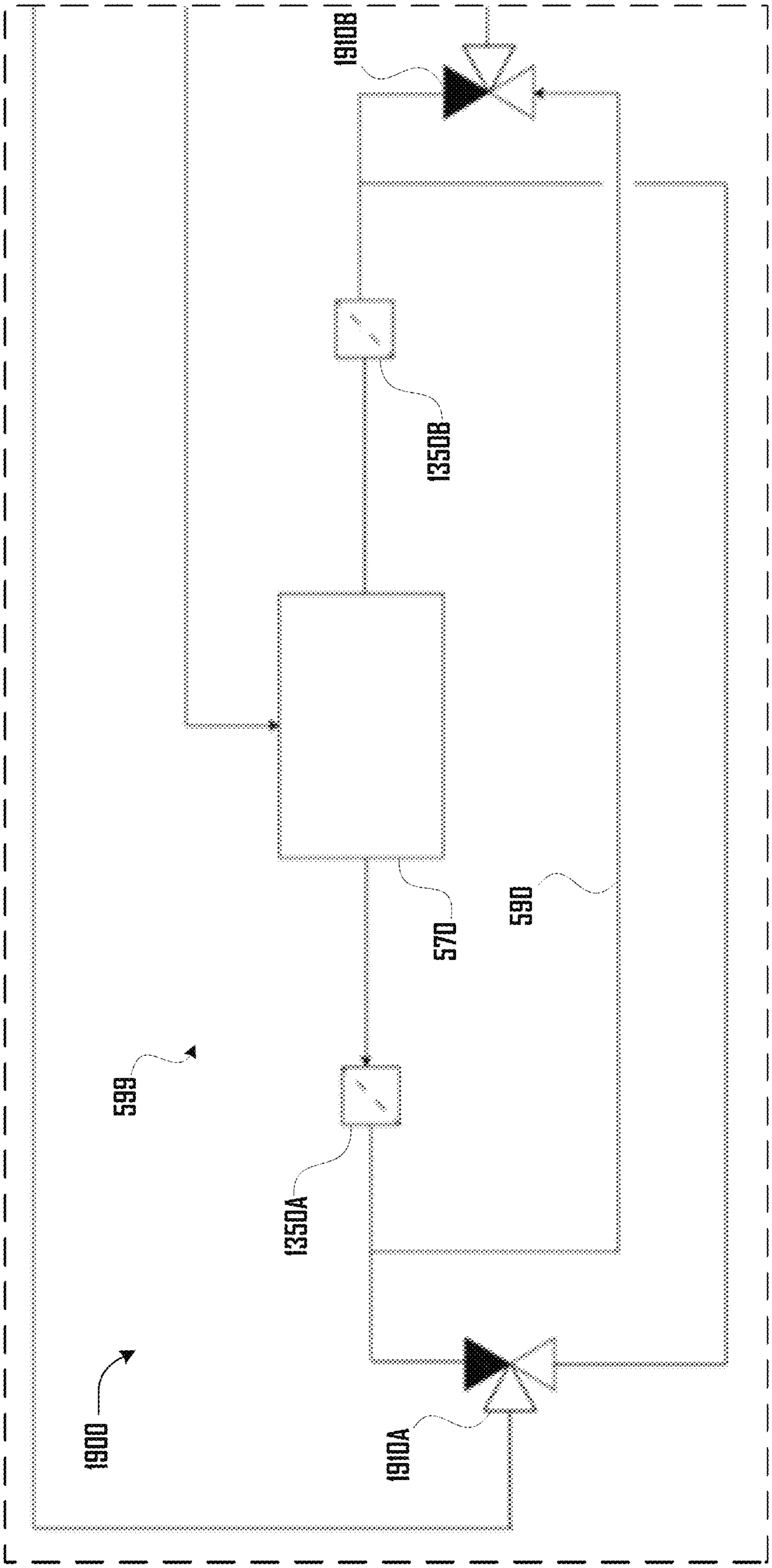
FIG. 21 illustrates an enlarged portion of the configuration of FIG. 19*b*.
Figure 22A:
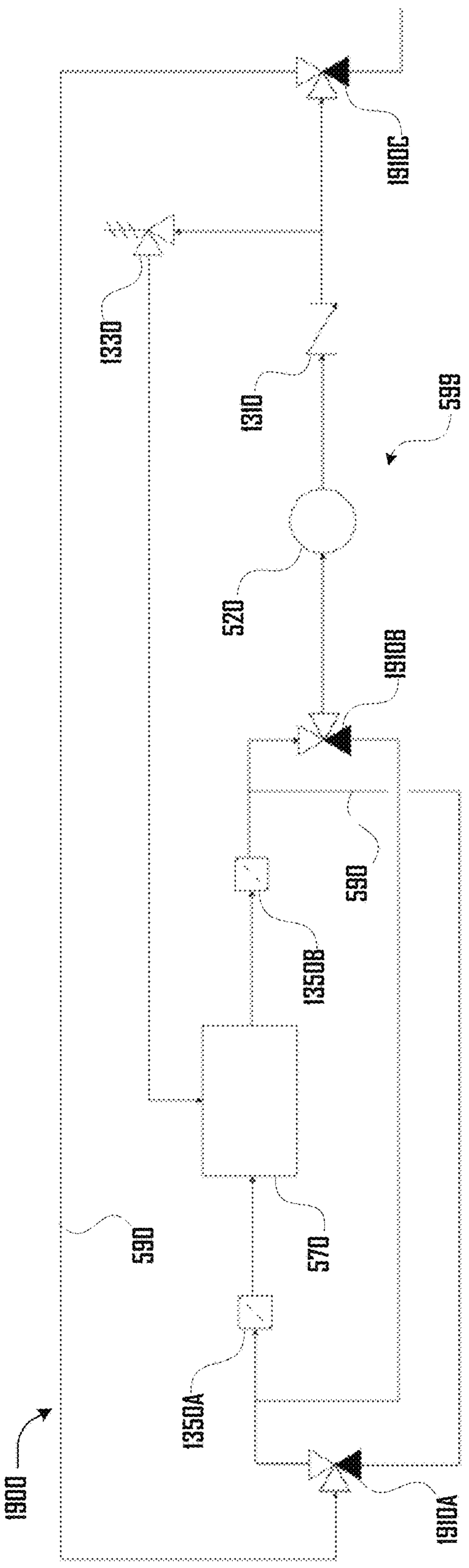
FIGS. 22*a* and 22*b* illustrate an example of an embodiment of a fluid handling system in an unclogging cycle where the first and second three-way valves switch configurations.
Figure 22B:
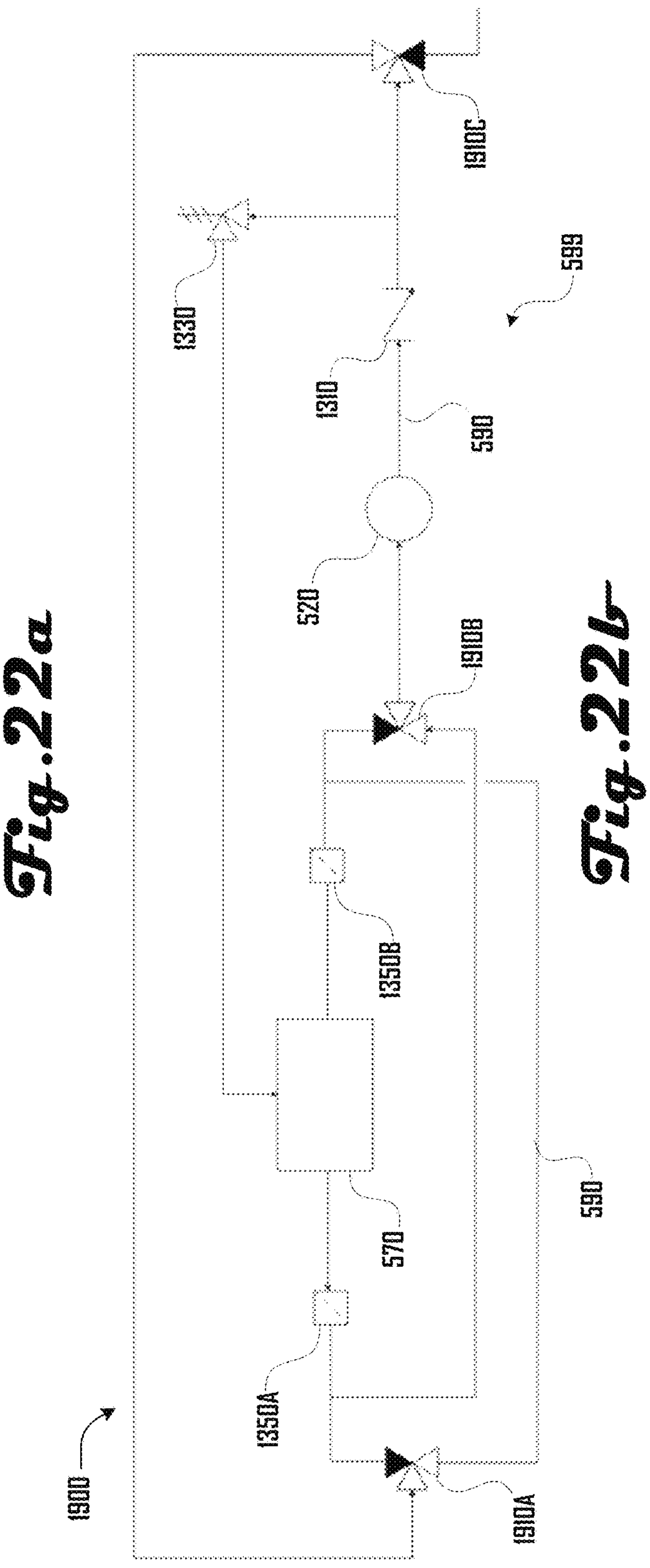

FIGS. 19*a*, 19*b*, 20, 21, 22*a* and 22*b* illustrate an example embodiment 1900 of a fluid handling system 599 in various configurations. FIGS. 19*a* and 20 illustrate the example embodiment 1900 of the fluid handling system 599 in a first flow loop-nozzle spray cycle and FIGS. 19*b* and 21 illustrate the example embodiment 1900 of the fluid handling system 599 in a second flow loop-nozzle spray cycle. FIGS. 22*a* and 22*b* illustrate an example of the embodiment 1900 of the fluid handling system 599 in an unclogging cycle. In some embodiments, an unclogging cycle can be triggered by a user, triggered on a regular schedule, triggered based on a determined flow rate within portions of the system being below a threshold, triggered based on pressure within portions of the system being above a threshold, or the like.

The example embodiment 1900 comprises an external unit reservoir 570, which can obtain and store fluid 595 in various suitable ways as discussed herein. Fluid lines 590 can couple a plurality of components including a first and second debris filter 1350A, 1350B that are upstream and/or downstream of the external unit reservoir 570 depending on the configuration and a first, second and third three-way valve 1910A, 1910B, 1910C. A fluid pump 520 and check valve 1310 are disposed in series between the second and third three-way valves 1910B, 1910C, with a relief valve 1330 disposed on a fluid line branch between the check valve 1310 and the third three-way valve 1910C. A pressure regulator 1920, pressure gauge 1930 and nozzle 1230 are downstream of the third three-way valve 1910C.

FIG. 20 illustrates an enlarged and broken up version of the configuration of FIG. 19*a*. FIG. 21 illustrates an enlarged portion of the configuration of FIG. 19*b*. FIGS. 22*a* and 22*b* illustrate an example of the embodiment 1900 of the fluid handling system 599 in an unclogging cycle where the first and second three-way valves 1910A, 1910B switch configurations.

In various embodiments, a heat pump system 100 can have a suitable fluid removal system such that the heat pump system 100 has one or more of the following capabilities: ice does not form on the heat pump system 100 as a consequence of fluid disposal operation that results in ice pieces of mass >16 g breaking off when melting occurs; the heat pump system 100 can dispose of fluid without letting >1 mL/hr of fluid drip from the sprayers 580 when it is not precipitating outside (e.g., to prevent freezing of surfaces below the heat pump system 100 in cold weather); the heat pump system 100 can be capable of disposing of 20 L/day of fluid 595 at 34° F. (e.g., to handle the amount of meltwater expected for some examples of a 9000 BTU/hr @17 F system, with a safety factor of 1.2); heat pump system 100 can be able to continuously handle at least 1.40 L per hour of fluid 595 without the external unit reservoir 570 overflowing when operating at 30° ° C. (86° F.) and 95% relative humidity (e.g., to prevent overflow from the external unit reservoir 570 when the heat pump system 100 is running in cooling mode and generating condensate); the fluid removal system can be configured to continue to operate if the fluid 595 contains debris; the fluid removal system can be operable to function normally after a power loss has been restored; the fluid removal system can have a power consumption of ≤40 W; the fluid removal system can be configured to only overflow from meltwater/condensate generation when it is precipitating outside.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

Example 1

Figure 27:
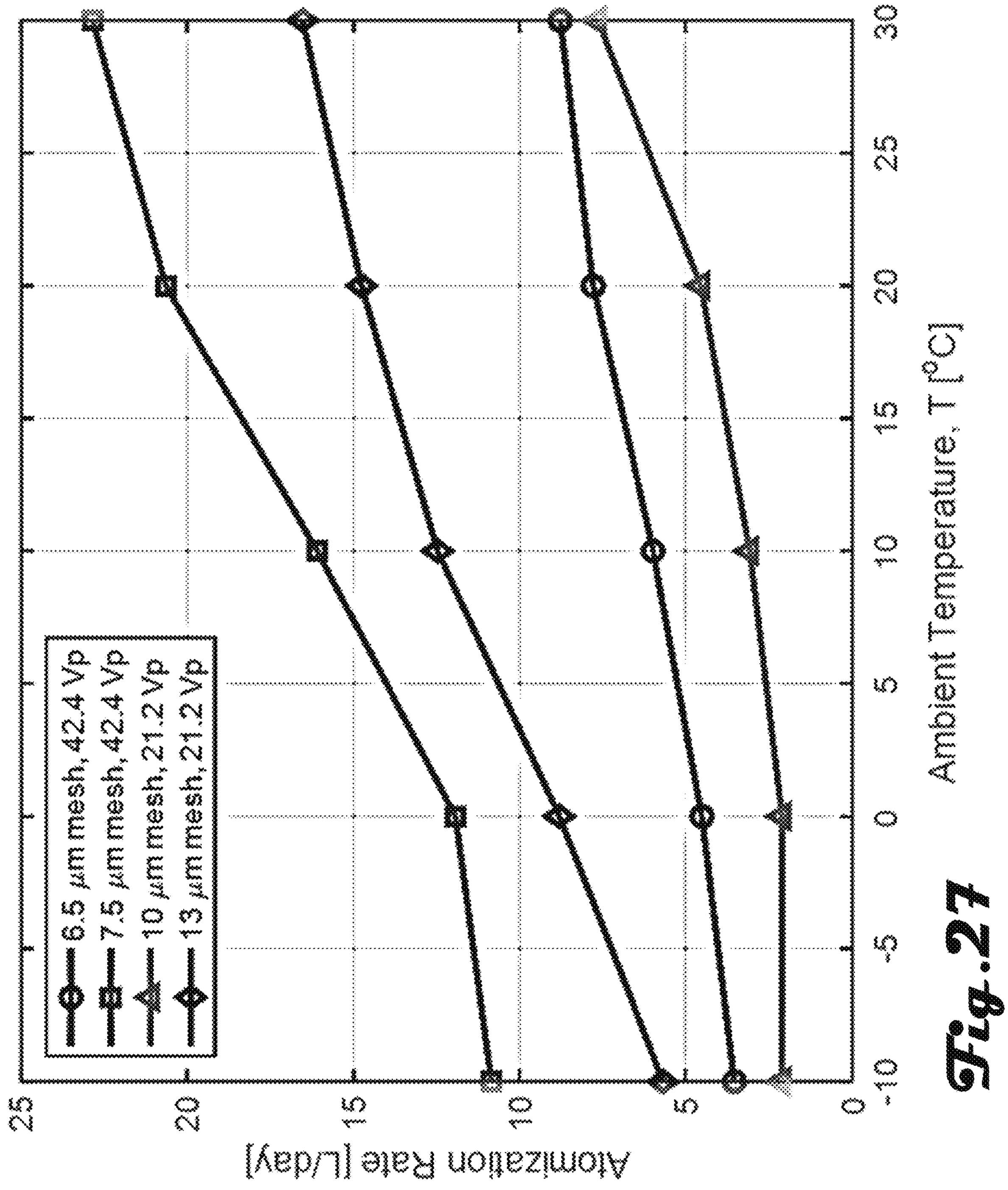
FIG. 27 illustrates the results of a test performed on 6.5 μm and 7.5 μm mesh atomizers at 42.4 V peak compared to 10 μm and 13 μm atomizers operating at 21.2 V peak.

A test was performed on 6.5 μm and 7.5 μm mesh atomizers at 42.4 V peak compared to 10 μm and 13 μm atomizers operating at 21.2 V peak. The results are shown in FIG. 27.

Test results indicate the following rank in terms of atomization capacity: 7.5 μm mesh, 42.4 V peak; 13 μm mesh, 21.2 V peak; 6.5 μm mesh, 42.4 V peak and 10 μm mesh, 21.2 V peak.

Example 2

Flow testing was performed on 6.5 μm and 7.5 μm mesh atomizers at 42.4 V peak compared to 10 μm and 13 μm atomizers operating at 21.2 V peak to determine the number of atomizers required to generate a spray rate of at least 6.67 L/day at 0° and a spray rate of at least 11.2 L/day at 30°. The results are shown in FIG. 28.

What is claimed is:

1. A heat pump system, the heat pump system comprising:
an internal unit that includes:
an internal unit heat exchanger,
an internal unit fan, and
an internal unit reservoir disposed below the internal unit heat exchanger and configured to receive fluid dripping from the internal unit heat exchanger;
an external unit that includes:
an external unit heat exchanger,
an external unit fan, and
an external unit reservoir disposed below the external unit heat exchanger and configured to receive fluid dripping from the external unit heat exchanger;
a bridge extending between the internal unit and the external unit;
a heat pump system cavity defined by the internal unit, the external unit and the bridge;
and
a fluid handling system that includes:
a first fluid line,
a fluid pump that pumps fluid from the internal unit reservoir into the external unit reservoir via the first fluid line, and
at least one sprayer disposed proximate to a front face and a bottom face of the external unit, the at least one sprayer configured to obtain fluid from the external unit reservoir and expel the fluid obtained from the external unit reservoir into an outdoor space, wherein:
the external unit reservoir is defined as an integral part of an external unit housing base comprising a collection area and comprising a linear slope to allow for fluid to drain toward the collection area of the external unit housing base, with the linear slope being from a rear face of the external unit reservoir toward a front face of the external unit reservoir and terminating at the collection area,
the housing base comprises at least one fluid port fluidly coupled with the collection area, and
each of the at least one sprayer is fluidly coupled to the collection area via one of the at least one fluid port to obtain fluid from the collection area.

2. The heat pump system of claim 1, wherein the at least one sprayer are ultrasonic perforated mesh atomizers having between 7.0 μm mesh size and 14.0 μm mesh size and collectively configured to generate a spray rate of at least 6.67 L/day at 0° C. and a spray rate of at least 11.2 L/day at 30° C. and operating at a driving voltage of 15-42.4 V peak.

3. The heat pump system of claim 1, wherein the external unit reservoir is configured to hold between 3.5 to 5 Liters of fluid without overflowing.

4. The heat pump system of claim 1, further comprising a heating assembly that includes a Positive Temperature Coefficient (PTC) heating element that snakes within a plurality of at least one bracket that defines the at least one fluid port, the heating element heated via electric power to heat the at least one bracket along with heating the at least one sprayer that is respectively associated with the at least one bracket and the at least one fluid port, the heating of the heating element preventing fluid proximate to the heating element from freezing, which may otherwise clog the at least one sprayer and/or clog one or more intake tubes associated with the at least one sprayer, the heating element being between 4 and 6 feet in length and operating with a power of <45 W.

5. A heat pump system, the heat pump system comprising:
an internal unit;
an external unit that includes:
an external unit heat exchanger, and
an external unit reservoir disposed below the external unit heat exchanger and configured to receive fluid dripping from the external unit heat exchanger;
a bridge extending between the internal unit and the external unit;
a heat pump system cavity defined by the internal unit, the external unit and the bridge; and
a fluid handling system that includes:
at least one sprayer configured to obtain fluid from the external unit reservoir and expel the obtained fluid from the external unit, wherein:
the external unit reservoir is defined as an integral part of an external unit housing base comprising a collection area and comprising a linear slope to allow for fluid to drain toward the collection area of the external unit housing base, with the linear slope being from a rear face of the external unit reservoir toward a front face of the external unit reservoir and terminating at the collection area,
the housing base comprises at least one fluid port fluidly coupled with the collection area, and
each of the at least one sprayer is fluidly coupled to the collection area via one of the at least one fluid port to obtain fluid from the collection area.

6. The heat pump system of claim 5, wherein the internal unit includes:
an internal unit heat exchanger, and an internal unit reservoir disposed below the internal unit heat exchanger and configured to receive fluid dripping from the internal unit heat exchanger.

7. The heat pump system of claim 5, wherein the fluid handling system further comprises a first fluid line and a fluid pump that pumps fluid from an internal unit reservoir into the external unit reservoir via the first fluid line.

8. The heat pump system of claim 5, wherein the at least one sprayer is disposed proximate to a front face and a bottom face of the external unit.

9. A heat pump system, the heat pump system comprising:

an external unit that includes:

an external unit heat exchanger, and an external unit reservoir configured to receive fluid from the external unit heat exchanger; and a fluid handling system that includes:

one or more sprayers configured to obtain fluid from the external unit reservoir and expel the obtained fluid from the external unit, wherein:

the external unit reservoir is defined as an integral part of an external unit housing base comprising a collection area and comprising a linear slope to allow for fluid to drain toward the collection area of the external unit housing base, with the linear slope being from a rear face of the external unit reservoir toward a front face of the external unit reservoir and terminating at the collection area, the housing base comprises at least one fluid port fluidly coupled with the collection area, and each of the one or more sprayer is fluidly coupled to the collection area via one of the at least one fluid port to obtain fluid from the collection area.

10. The heat pump system of claim 9, wherein the external unit reservoir is disposed below the external unit heat exchanger and configured to receive fluid dripping from the external unit heat exchanger.

11. The heat pump system of claim 9, wherein the fluid handling system further comprises a first fluid line and a fluid pump that pumps fluid from an internal unit reservoir into the external unit reservoir via the first fluid line.

12. The heat pump system of claim 9, wherein the one or more sprayers are disposed proximate to a front face and a bottom face of the external unit.

13. The heat pump system of claim 9, wherein the one or more sprayers are rotary or ultrasonic atomizers having between 7.0 μm mesh size and 14.0 μm mesh size.

14. The heat pump system of claim 9, wherein the one or more sprayers are configured to generate a spray rate of at least 6.67 L/day at 0° and a spray rate of at least 11.2 L/day at 30°.

15. The heat pump system of claim 9, wherein the external unit reservoir is configured to hold between 2 to 6 Liters of fluid.

16. The heat pump system of claim 9, further comprising a heating assembly that includes a heating element configured to prevent fluid proximate to the heating element from freezing, which may otherwise clog the one or more sprayers and/or clog one or more intake tubes associated with the one or more sprayers.

* * * * *